US012619623B2

(12) United States Patent　　　　(10) Patent No.:　US 12,619,623 B2

Gould　　　　　　　　　　　　　　　(45) Date of Patent:　　May 5, 2026

(54) ON-DEMAND RETRIEVAL OF STRUCTURED DATA IN AGGREGATING DATA ACROSS DISTINCT SOURCES

(71) Applicant: Ab Initio Technology LLC, Lexington, MA (US)

(72) Inventor: Joel Gould, Arlington, MA (US)

(73) Assignee: Ab Initio Technology LLC, Lexington, MA (US)

( * ) Notice: Subject to any disclaimer, the term of this patent is extended or adjusted under 35 U.S.C. 154(b) by 0 days.

(21) Appl. No.: 18/338,180

(22) Filed: Jun. 20, 2023

(65) Prior Publication Data

US 2024/0248904 A1　　Jul. 25, 2024

Related U.S. Application Data

(60) Provisional application No. 63/481,488, filed on Jan. 25, 2023.

(51) Int. Cl.
G06F 16/248　　　(2019.01)
G06F 9/451　　　(2018.01)
G06F 16/2455　　(2019.01)
G06F 16/25　　　(2019.01)

(52) U.S. Cl.
CPC ............ G06F 16/248 (2019.01); G06F 9/451 (2018.02); G06F 16/24556 (2019.01); G06F 16/254 (2019.01)

(58) Field of Classification Search
None
See application file for complete search history.

(56) References Cited

U.S. PATENT DOCUMENTS

| | | | |
|---|---|---|---|
| 5,966,072 A | 10/1999 | Stanfill et al. | |
| 7,908,076 B2 | 3/2011 | Downs et al. | |
| 9,454,578 B2 | 9/2016 | Anzalone et al. | |
| 9,817,561 B2 | 11/2017 | Mital et al. | |
| 9,959,267 B2 | 5/2018 | Folting et al. | |
| 10,037,364 B1 * | 7/2018 | Kalinichenko | ....... G06F 16/248 |
| 10,122,783 B2 | 11/2018 | Qiao et al. | |
| 10,831,509 B2 | 11/2020 | Ravid et al. | |
| 11,080,905 B1 | 8/2021 | McCarty et al. | |
| 11,210,285 B2 | 12/2021 | Egenolf et al. | |
| 2008/0082959 A1 | 4/2008 | Fowler | |
| 2008/0320012 A1 * | 12/2008 | Loving | ................ G06F 16/213 |
| 2010/0185618 A1 | 7/2010 | Peterson | |
| 2015/0026167 A1 * | 1/2015 | Neels | .................. G06F 16/9535 707/723 |
| 2017/0177446 A1 | 6/2017 | MacLean et al. | |

(Continued)

OTHER PUBLICATIONS

Axios, "Batch chart generator", Oct. 12, 2021 (Year: 2021).*

(Continued)

*Primary Examiner* — Yu Zhao

(74) *Attorney, Agent, or Firm* — Fish & Richardson P.C.

(57)　　　　ABSTRACT

A method for enabling a user to generate a complex aggregation on their own by providing the user with a graphical user interface that displays data items in a data catalog and that provides controls for the user to select data items to be used in generating the complex aggregation, and to select a type of aggregation, and based on the user's selections, automatically generating computer instructions to generate a value of the complex aggregation is described.

25 Claims, 11 Drawing Sheets

(56)                 References Cited

U.S. PATENT DOCUMENTS

| | | | |
|---|---|---|---|
| 2017/0371926 A1 | 12/2017 | Shiran et al. | |
| 2018/0174229 A1* | 6/2018 | Sherwin | G06Q 30/0613 |
| 2019/0130048 A1 | 5/2019 | Egenolf et al. | |
| 2020/0380212 A1 | 12/2020 | Butler et al. | |
| 2021/0004244 A1 | 1/2021 | Ravid et al. | |
| 2021/0374109 A1 | 12/2021 | Shimanovsky et al. | |
| 2022/0004561 A1 | 1/2022 | Sherman | |
| 2022/0035873 A1* | 2/2022 | Rama | G06F 16/24547 |
| 2022/0197899 A1* | 6/2022 | Kanani | G06F 16/285 |

OTHER PUBLICATIONS

International Search Report and Written Opinion in International Appln. No. PCT/US2024/012793, mailed on Apr. 8, 2024, 18 pages.

Jorges et al., "Building Code Generations with Genesys: A Tutorial Introduction," 18th International Conference, Austin, Texas, Jul. 6, 2009, 364-385 pages.

Thamson et al., "Visually Programming Dataflows for Distributed Data Analytics," IEEE International Conference on Big Data, Dec. 5, 2016, 2276-2285 pages.

Infocepts.com [online], "Achieve Real-Time Data Analysis with a Virtual Data Warehouse," Jan. 19, 2016, retrieved from URL<https://www.infocepts.com/blog/achieve-real-time-data-analysis-with-avirtual-data-warehouse/>, 6 pages.

Rockset.com [online], "Real-Time Analytics in the World of Virtual Reality and Live Streaming," Sep. 6, 2019, retrieved on Aug. 22, 2023, retrieved from URL<https://rockset.com/blog/real-time-analytics-virtual-reality-live-streaming/>, 9 pages.

Segment.com [online], "Create real-time audiences (campaigns, lookalikes, ad suppression, etc.)," retrieved on Aug. 22, 2023, retrieved from URL<https://segment.com/use-cases/create-real-time-audiences/>, 7 pages.

Setiadji et al., "Development of Back-calculation Model for Aggregate Gradation Determination Using Fractal Theory," MATEC Web of Conferences, Mar. 30, 2018, 159(01006):1-6.

Splunk.com [online], "Stream Processor Service: Function Reference," retrieved on Jun. 9, 2022, retrieved from URL<www.splunk.com>, 5 pages.

Tibco.com online, "Anything 360," retrieved on Aug. 22, 2023, retrieved from URL<https://www.tibco.com/solutions/anything-360>, 6 pages.

TowardsDataScience.com online, "The Anatomy of an Active Metadata Platform," Aug. 12, 2021, retrieved on Aug. 22, 2023, retrieved from URL<https://towardsdatascience.com/the-anatomy-of-an-active-metadata-platform-13473091ad0d>, 18 pages.

International Preliminary Report on Patentability in International Appln. No. PCT/US2024/012793, mailed on Aug. 7, 2025, 14 pages.

* cited by examiner

150

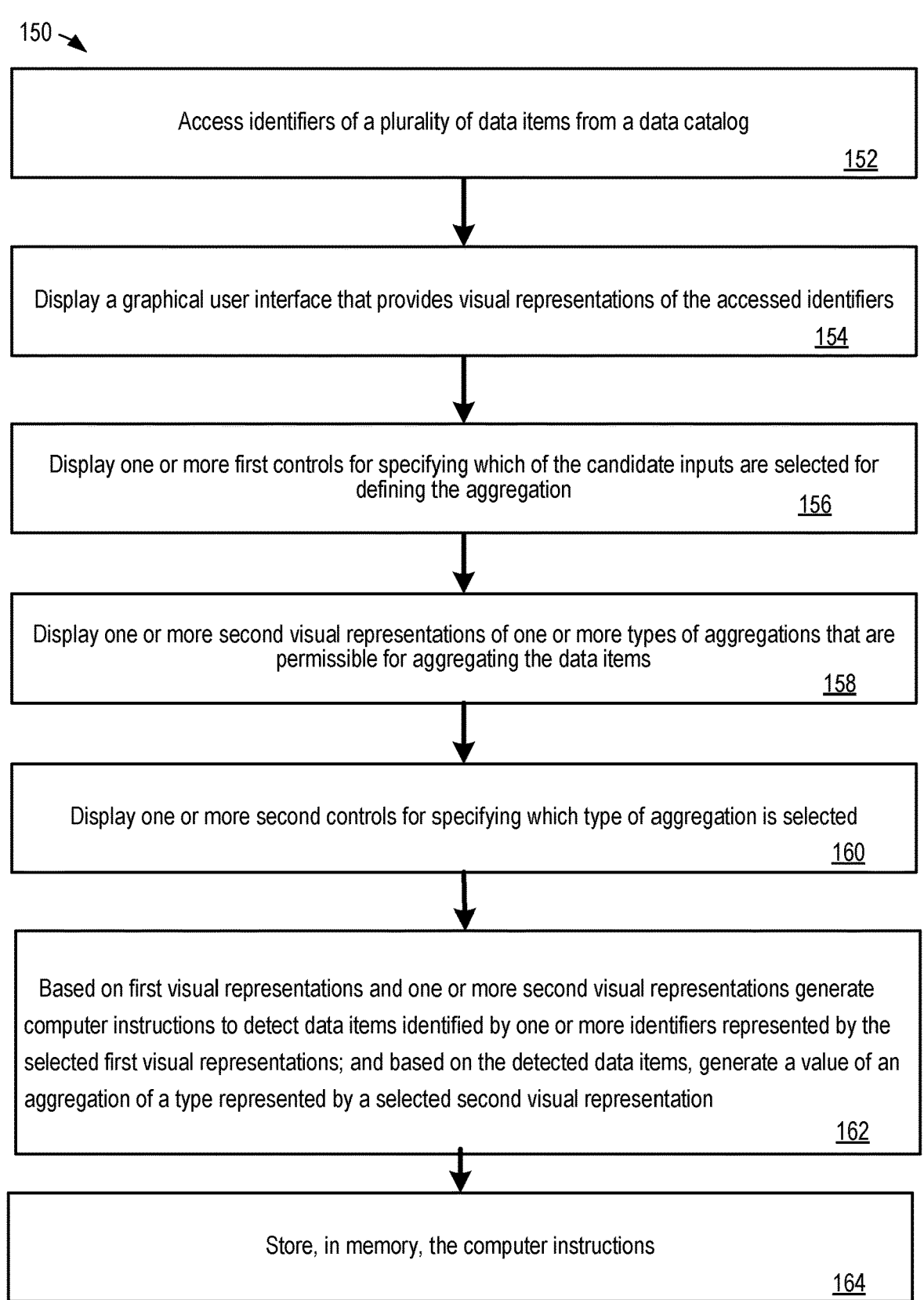

Access identifiers of a plurality of data items from a data catalog

152

Display a graphical user interface that provides visual representations of the accessed identifiers

154

Display one or more first controls for specifying which of the candidate inputs are selected for defining the aggregation

156

Display one or more second visual representations of one or more types of aggregations that are permissible for aggregating the data items

158

Display one or more second controls for specifying which type of aggregation is selected

160

Based on first visual representations and one or more second visual representations generate computer instructions to detect data items identified by one or more identifiers represented by the selected first visual representations; and based on the detected data items, generate a value of an aggregation of a type represented by a selected second visual representation

162

Store, in memory, the computer instructions

ON-DEMAND RETRIEVAL OF STRUCTURED DATA IN AGGREGATING DATA ACROSS DISTINCT SOURCES

CLAIM OF PRIORITY

This application claims priority under 35 U.S.C. § 119(e) to U.S. Patent Application Ser. No. 63/481,488, filed on Jan. 25, 2023, the entire contents of which are hereby incorporated by reference.

BACKGROUND

This disclosure relates to techniques for efficiently operating a data processing system with a large number of datasets that may be stored in any of a large number of data stores.

Modern data processing systems manage vast amounts of data within an enterprise. A large institution, for example, may have millions of datasets. These datasets can support multiple aspects of the operation of the enterprise. Complex data processing systems typically process data in multiple stages, with the results produced by one stage being fed into the next stage. The overall flow of information through such systems may be described in terms of a directed dataflow graph, with nodes or vertices in the graph representing components (either data files or processes), and the links or "edges" in the graph indicating flows of data between the components. A system for executing such graph-based computations is described in U.S. Pat. No. 5,966,072, titled "Executing Computations Expressed as Graphs," incorporated herein by reference.

Graphs also can be used to invoke computations directly. Graphs made in accordance with this system provide methods for getting information into and out of individual processes represented by graph components, for moving information between the processes, and for defining a running order for the processes. Systems that invoke these graphs include algorithms that choose inter-process communication methods and algorithms that schedule process execution, and also provide for monitoring of the execution of the graph.

To support a wide range of functions, a data processing system may execute applications, whether to implement routine processes or to extract insights from the datasets. The applications may be programmed to access the data stores to read and write data.

SUMMARY

In a general aspect 1, described is a method implemented by a data processing system for providing a user with a graphical user interface that displays data items in a data catalog and that provides controls for the user to select data items to be used in generating one or more aggregations, wherein the controls also enable the user to select a type of aggregation, and based on user's selections, automatically generating computer instructions to generate a value of the one or more aggregations that the user had selected, the method including: accessing identifiers of a plurality of data items from a data catalog; displaying a graphical user interface that provides first visual representations of the identifiers accessed from the data catalog, with the identifiers representing candidate inputs for defining an aggregation; displaying, in the graphical user interface, one or more first controls for specifying which of the candidate inputs are selected for defining the aggregation; wherein a first control specifies which of the candidate inputs are selected by enabling selection of a first visual representation, wherein a selected, first visual representation specifies an identifier selected for defining the aggregation; displaying, in the graphical user interface, one or more second visual representations of one or more types of aggregations that are permissible for aggregating the data items; displaying, in the graphical user interface, one or more second controls for specifying which type of aggregation is selected; wherein a second control specifies which type of aggregation is selected by enabling selection of a second visual representation; based on first visual representations selected by at least one of the one or more first controls and one or more second visual representations selected by at least one of the one or more second controls, generating, by the data processing system, computer instructions that are executable to: detect data items identified by one or more identifiers represented by the selected first visual representations; and based on the detected data items, generate one or more values of one or more aggregations of one or more types represented by one or more selected second visual representations; and storing, in memory, the computer instructions.

In an aspect 2 according to aspect 1, the method further includes: based on the first visual representations selected by the at least one of the one or more first controls and the one or more second visual representations selected by the at least one of the one or more second controls, generating a definition of the aggregation; wherein the definition specifies identifiers represented by the selected first visual representations, and wherein the definition specifies a type represented by the one or more selected second visual representations.

In an aspect 3 according to any one of aspects 1 to 2, the detecting of data items identified by one or more identifiers represented by the selected first visual representations includes detecting a first item from a first data source and a second data item from a second data source, wherein the first and second data items are identified by one or more identifiers represented by the selected first visual representations, and wherein the first and second data sources are distinct and/or different data sources; and wherein the generating of the one or more values of the one or more aggregations of the one or more types represented by the one or more selected second visual representations includes generating the values of the aggregations of the types represented by the selected second visual representations based on the detected first and second data items.

In an aspect 4 according to any one of aspects 1 to 3, the generating of the computer instructions further includes: generating a first transform based on the selected first visual representations, wherein the first transform is configured to be inserted into one or more placeholders in one or more pre-configured templates of one or more computation graphs.

In an aspect 5 according to any one of aspects 1 to 4, the generating of the computer instructions further includes: generating a second transform based on the selected second visual representation, wherein the second transform is configured to be inserted into a placeholder in the one or more pre-configured templates of the one or more computation graphs.

In an aspect 6 according to any one of aspects 1 to 5, the generating of the computer instructions further including: inserting the first transform and the second transform into the respective placeholders in the one or more pre-configured templates of the one or more computation graphs for generating the aggregation.

In an aspect 7 according to any one of aspects 1 to 6, the method further includes: in response to receiving a request for the aggregate, executing the stored computer instructions to detect data items identified by one or more identifiers represented by the selected first visual representations and to generate the one or more values of the one or more aggregations of the one or more types represented by the one or more selected second visual representations based on the detected data items.

In an aspect 8 according to any one of aspects 1 to 7, wherein the one or more aggregates include multiple aggregates, and the computer instructions are configured such that the data items used for the multiple aggregates are to be queried in a single query from one or more data storages.

In an aspect 9 according to any one of aspects 1 to 8, wherein the one or more templates of the one or more computation graphs include a template batch graph, wherein the template batch graph includes a placeholder for insertion of the first transform such that the template batch graph with the first transform inserted into the placeholder of the template batch graph is configured to perform, in predetermined time intervals, batch retrieval from disk of data items used for the one or more aggregates.

In an aspect 10 according to any one of aspects 1 to 9, wherein the batch retrieval from disk of the data items is performed by querying the data items in a single query from the disk.

In an aspect 11 according to any one of aspects 1 to 10, wherein the one or more templates of the one or more computation graphs include a template real-time graph, and wherein the template real-time graph includes a placeholder for insertion of the first transform, such that the template real-time graph with the first transform inserted into the placeholder of the template real-time graph is configured to perform real-time retrieval from memory of data items used for the one or more aggregates.

In an aspect 12 according to any one of aspects 1 to 11, wherein the memory is volatile memory.

In an aspect 13 according to any one of aspects 1 to 12, wherein the real-time retrieval from memory of the data items is performed by querying the data items in a single query from the memory.

In an aspect 14 according to any one of aspects 1 to 13, wherein the one or more templates of the one or more computation graphs further include a template aggregate graph, which includes a placeholder for insertion of the second transform.

In an aspect 15 according to any one of aspects 1 to 14, wherein the template aggregate graph is connected with the output of the template batch graph and the output of the template real-time graph such that, with the second transform inserted into the placeholder of the template aggregate graph, results of the batch retrieval are supplemented with results from the real-time retrieval to generate one or more values of one or more aggregations of one or more types represented by one or more selected second visual representations.

In an aspect 16 according to any one of aspects 1 to 15, wherein the displaying, in the graphical user interface, of the one or more second visual representations of the one or more types of aggregations that are permissible for aggregating the data items is based on the selected first visual representation, preferably such that only second visual representations of types of aggregations that are permissible for aggregating the data items identified by the identifier that are specified by the selected first visual representation are displayed in the graphical user interface.

In an aspect 17 according to any one of aspects 1 to 16, further including: displaying, in the graphical user interface, one or more third controls for specifying a duration over which the aggregation is generated.

In an aspect 18 according to any one of aspects 1 to 17, further including: displaying, in the graphical user interface, one or more fourth controls for specifying an event type over which the aggregation is generated.

In a general aspect 19, a data processing system for providing a user with a graphical user interface that displays data items in a data catalog and that provides controls for the user to select data items to be used in generating one or more aggregations, wherein the controls also enable the user to select a type of aggregation, and based on user's selections, automatically generating computer instructions to generate a value of the one or more aggregations that the user had selected, the data processing system to perform the actions of: accessing identifiers of a plurality of data items from a data catalog; displaying a graphical user interface that provides first visual representations of the identifiers accessed from the data catalog, with the identifiers representing candidate inputs for defining an aggregation; displaying, in the graphical user interface, one or more first controls for specifying which of the candidate inputs are selected for defining the aggregation; wherein a first control specifies which of the candidate inputs are selected by enabling selection of a first visual representation, wherein a selected, first visual representation specifies an identifier selected for defining the aggregation; displaying, in the graphical user interface, one or more second visual representations of one or more types of aggregations that are permissible for aggregating the data items; displaying, in the graphical user interface, one or more second controls for specifying which type of aggregation is selected; wherein a second control specifies which type of aggregation is selected by enabling selection of a second visual representation; based on first visual representations selected by at least one of the one or more first controls and one or more second visual representations selected by at least one of the one or more second controls, generating, by the data processing system, computer instructions that are executable to: detect data items identified by one or more identifiers represented by the selected first visual representations; and based on the detected data items, generate one or more values of one or more aggregations of one or more types represented by one or more selected second visual representations; and storing, in memory, the computer instructions.

In an aspect 20 according to aspect 19, wherein the data processing system further performs the actions of: based on the first visual representations selected by the at least one of the one or more first controls and the one or more second visual representations selected by the at least one of the one or more second controls, generating a definition of the aggregation; wherein the definition specifies identifiers represented by the selected first visual representations, and wherein the definition specifies a type represented by the one or more selected second visual representations.

In an aspect 21 according to any one of aspects 19 to 20, wherein the data processing system further performs the actions of: generating a first transform based on the selected first visual representations, wherein the first transform is configured to be inserted into one or more placeholders in one or more pre-configured templates of one or more computation graphs.

In an aspect 22 according to any one of aspects 19 to 21, wherein the data processing system further performs the actions of: generating a second transform based on the selected second visual representation, wherein the second transform is configured to be inserted into a placeholder in the one or more pre-configured templates of the one or more computation graphs.

In an aspect 23 according to any one of aspects 19 to 22, wherein the data processing system further performs the actions of: inserting the first transform and the second transform into the respective placeholders in the one or more pre-configured templates of the one or more computation graphs for generating the aggregation.

In an aspect 24 according to any one of aspects 19 to 23, wherein the data processing system further performs the actions of: displaying, in the graphical user interface, one or more third controls for specifying a duration over which the aggregation is generated.

In an aspect 25 according to any one of aspects 19 to 24, wherein the data processing system further performs the actions of: displaying, in the graphical user interface, one or more fourth controls for specifying an event type over which the aggregation is generated.

In a general aspect 26, one or more machine-readable hardware storage devices for providing a user with a graphical user interface that displays data items in a data catalog and that provides controls for the user to select data items to be used in generating one or more aggregations, wherein the controls also enable the user to select a type of aggregation, and based on user's selections, automatically generating computer instructions to generate a value of the one or more aggregations that the user had selected, to cause a data processing system to perform the actions of: accessing identifiers of a plurality of data items from a data catalog; displaying a graphical user interface that provides first visual representations of the identifiers accessed from the data catalog, with the identifiers representing candidate inputs for defining an aggregation; displaying, in the graphical user interface, one or more first controls for specifying which of the candidate inputs are selected for defining the aggregation; wherein a first control specifies which of the candidate inputs are selected by enabling selection of a first visual representation, wherein a selected, first visual representation specifies an identifier selected for defining the aggregation; displaying, in the graphical user interface, one or more second visual representations of one or more types of aggregations that are permissible for aggregating the data items; displaying, in the graphical user interface, one or more second controls for specifying which type of aggregation is selected; wherein a second control specifies which type of aggregation is selected by enabling selection of a second visual representation; based on first visual representations selected by at least one of the one or more first controls and one or more second visual representations selected by at least one of the one or more second controls, generating, by the data processing system, computer instructions that are executable to: detect data items identified by one or more identifiers represented by the selected first visual representations; and based on the detected data items, generate one or more values of one or more aggregations of one or more types represented by one or more selected second visual representations; and storing, in memory, the computer instructions.

In an aspect 27 according to aspect 26, wherein the operations further include based on the first visual representations selected by the at least one of the one or more first controls and the one or more second visual representations selected by the at least one of the one or more second controls, generating a definition of the aggregation; wherein the definition specifies identifiers represented by the selected first visual representations, and wherein the definition specifies a type represented by the one or more selected second visual representations.

In an aspect 28 according to any one of aspects 26 to 27, wherein the operations further include generating a first transform based on the selected first visual representations, wherein the first transform is configured to be inserted into one or more placeholders in one or more pre-configured templates of one or more computation graphs.

In an aspect 29 according to any one of aspects 26 to 28, wherein the operations further include generating a second transform based on the selected second visual representation, wherein the second transform is configured to be inserted into a placeholder in the one or more pre-configured templates of the one or more computation graphs.

In an aspect 30 according to any one of aspects 26 to 29, wherein the operations further include inserting the first transform and the second transform into the respective placeholders in the one or more pre-configured templates of the one or more computation graphs for generating the aggregation.

In an aspect 31 according to any one of aspects 26 to 30, wherein the operations further include displaying, in the graphical user interface, one or more third controls for specifying a duration over which the aggregation is generated.

In an aspect 32 according to any one of aspects 26 to 31, wherein the operations further include displaying, in the graphical user interface, one or more fourth controls for specifying an event type over which the aggregation is generated.

In a general aspect 33, a data processing system includes a batch module, wherein the batch module is configured to receive a first transform and to insert the first transform into a placeholder of a pre-configured template batch graph, wherein the first transform specifies data items to be retrieved, and wherein the template batch graph is an executable computation graph that, with the first transform inserted into the placeholder of the template batch graph, is configured to perform, in predetermined time intervals, batch retrieval from disk of a portion of the data items to be retrieved; a real-time module, wherein the real-time module is configured to receive the first transform and to insert the first transform into a placeholder of a pre-configured template real-time graph, and wherein the template real-time graph is an executable computation graph that, with the first transform inserted into the placeholder of the template real-time graph, is configured to perform real-time retrieval from memory of another portion of the data items to be retrieved; an aggregate module, wherein the aggregate module is configured to receive a second transform different from the first transform and to insert the second transform into a placeholder of a pre-configured template aggregate graph, wherein the second transform specifies one or more aggregates to be computed for the data items to be retrieved, wherein the template aggregate graph is an executable computation graph that is connected with the output of the template batch graph and the output of the template real-time graph such that, with the second transform inserted into the placeholder of the template aggregate graph, data items from the batch retrieval are supplemented with data items from the real-time retrieval to generate one or more values of the one or more aggregates as specified by the second transform using the data items from the batch retrieval and the data items from the real-time retrieval.

In an aspect 34 according to aspect 33, wherein the batch retrieval from disk of the data items is performed by querying the data items in a single query from the disk.

In an aspect 35 according to any one of aspects 33 to 34, wherein the memory is volatile memory.

In an aspect 36 according to any one of aspects 33 to 35, wherein the real-time retrieval from memory of the data items is performed by querying the data items in a single query from the memory.

In an aspect 37 according to any one of aspects 33 to 36, wherein the first transform is executable code that is executed by the template batch graph to perform the batch retrieval and that is executed by the template real-time graph to perform the real-time retrieval, and wherein the second transform is executable code that is executed by the template aggregate graph to generate the one or more values.

In an aspect 38 according to any one of aspects 33 to 37, wherein the other portion of the data items to be retrieved has been stored by the memory for a predetermined amount of time or less before the current time.

One or more of the above aspects may provide one or more of the following advantages:

Aspects enable a data processing system to manage vast amounts of data, such as within an enterprise, and allows a user to easily produce complex aggregates based on selections of identifiers of data items of a supplied graphical user interface. The data processing system thus enables a user to generate the self-service (e.g., on-demand) complex aggregate (e.g., on their own) by providing the user with a graphical user interface that displays references to data items in a data catalog. The graphical user interface provides controls for the user to select data items to be used in generating the self-service complex aggregate, with the controls also enabling the user to select a type of aggregation. Based on the user's selections, the data processing system automatically generates computer instructions (computer code) to generate a value of the self-service complex aggregate that the user had selected.

There are numerous benefits to enabling self-service complex aggregations. One of these benefits is improved usage of resources. This is because in a traditional system, a user would code-up, e.g., generate code, to specify an aggregation. This code would then have to be tested, which would consume computing resources. Additionally, if there were bugs in the code that were identified once the code was running, then the program would have to be fixed and re-run, resulting in a duplication of computing resources. However, the system's ability to automatically generate the computer instructions to generate the aggregates ensures that there are no wasted computing resources on errors and/or on testing. Additionally, by enabling the system to generate the computer instructions for these aggregates, the system is able to perform auto optimizations, e.g., by specifying partition or sort components—when that improves the efficiency of the graph during execution.

Additionally, by enabling a user to browse a data catalog and to select which data items to use in an aggregation, the system is able to generate aggregates from distinct and/or different data sources, such as across an enterprise, generating aggregates that could not be generated before enabling a user to browse a data catalog and then automatically generate an aggregate. By generating these aggregates across distinct and/or different data sources, the system is able to identify system-wide errors that previously could not be identified. The identification of those errors provides a feedback loop through which input can be provided to the system to correct or address those errors.

The data processing system includes a data catalog that feeds a user interface generator and a client device that can feed a transform generator. The transform generator generates executable computer code in the form of transforms for inclusion in computation graphs for a batch module, a real-time module, and a real-time aggregate module. The batch module and the real-time module receives a first transform that configures a template batch graph and a template real-time graph, which also include placeholders for the first transform. The real-time aggregate module receives the second transform that configures a template aggregate graph, which also includes a placeholder for the second transform.

An aggregate can be either real-time or batch. As the names imply, a real-time aggregate is calculated using an up-to-the-second value, whereas a batch aggregate is updated during scheduled batch processing runs and will therefore be less current than the value of a real-time aggregate. Calculating the value of a real-time aggregate requires more memory and processing power than calculating the value of a batch aggregate. One approach to use of real-time aggregates is when up-to-the-second accuracy is required, while batch aggregates may be used for instances that do not require real-time accuracy.

A windowed aggregate is an aggregate of data gathered over a period of hours, days, weeks, or months. Aggregations of data from a period of, e.g., 48 hours or less, may be real-time and thus calculated entirely in memory. Aggregations of data from a period longer than, e.g., 48 hours, may be calculated in batch (on disk, using data that is 48 hours old) or in real-time (the first 48 hours held and calculated in memory, the remainder of the data calculated in batch).

As described herein, separation of the batch and real-time module provides for efficient usage of memory resources. This is because, through the batch module, batch retrieval of older data, that has already been stored to disk but is to be used for the aggregate can be done once a day and then the results of the batch retrieval can be supplemented with the real-time data is also to be used for the aggregate. The real-time data is stored in memory (e.g. volatile memory) before it is committed to disk. So, rather than storing all of the batch and real-time data in memory, memory only needs to store a most recent part of the incoming data items (such as the data items received within a predetermined amount of time before the current time), e.g., the last 24 hours-worth of data items, and the rest of the aggregate needed for the real-time aggregate to be retrieved from disk, thereby decreasing consumption of memory. Batch retrieval from disk allows to perform a single data retrieval from disk of the relevant data that is not anymore stored in the memory but is to be used for the aggregate.

Additionally, the efficient usage of resources by the means to allow for self-service complex aggregations is further improved by using pre-configured templates of computation graphs into which transforms (computer code) is inserted that is in accordance with what the user had selected as data items and aggregations. Then only the transform is generated when an aggregation is requested, while the rest of the templates already preexisted and has been tested and validated. This also further reduces the probability of errors. That is, the combination of the transform generator with the batch module, real-time module and the real-time aggregate module results in increased efficiency in actually generating the real-time aggregate. This is because the batch and real-time modules both have a template, thereby reducing the amount of coding that is needed to be done at the time of request for the complex aggregate. The same is true for the real-time aggregate module. Then, at the time of requesting or generating the aggregate, the only code that needs to be generated is for the specific transforms, T1 and T2, that will be inserted into the templates. Because this reduces the amount of coding that is needed to be performed at run-time, the system is able to more efficiently process the request for the real-time aggregate, with reduced latency and reduced probability of errors. Based on times associated with user selected data items to be used for the aggregate, the data processing system may determine to what extent the batch retrieval is used and to what extent the real-time retrieval is used. For example, if only most recent data items associated with times within a predetermined amount of time earlier than the current time (the time within which data is stored in the memory before storing the data to disk) are needed for the aggregate, then no transform must be inserted into the placeholder of the template batch graph, which further enhances efficient usage of computing resources.

The self-service complex aggregations described herein enable a user to define multiple different aggregates at the same time. A user defines aggregates based on selections of different values, e.g. in columns, of a supplied graphical user interface. The user can define multiple aggregates at the same time. The user can define an aggregate using many different and/or distinct sources of data from the data catalog at the same time. The definition (and execution) of multiple aggregates at the same time improves efficiency for both defining the complex aggregates and for the generated transforms that compute aggregates in a data processing system. This is compared to an efficiency of defining and executing multiple aggregates in series. For defining the complex aggregates, the transform generator accesses a data catalog. The data catalog includes labels, each representing a data set. A label could be a name or other information and/or data that identifies a data set. A label could specify a type of data, a data owner, a data source, and so forth.

The data catalog specifies datasets for different labels. The labels can be associated with attributes that describe the owner (e.g., a customer type). Each label is associated with one or more datasets in the data catalog, as well as one or more sets of metadata. The one or more sets of metadata can describe the dataset associated with the owner. The data catalog provides, for a given label, options for the types of aggregates that can be defined for that label. The transform generator enables the user to define multiple aggregates for a label at the same time. Definition of the multiple aggregates at the same time reduces the number of times the data catalog is accessed for defining a given aggregate. For each selected label, each of the available aggregate types, fields, conditions, and so forth of the dataset(s) associated with the label are presented based on accessing the data catalog in one request.

A reduction in data access requests from the data source (the data catalog) can improve query response times and reduce latencies for populating the generated user interface. That is, when multiple complex aggregates are executed at the same time, the data processing system performs a single data retrieval operation to retrieve the data needed for the multiple aggregates, rather than the data processing system having to perform multiple data retrieval operations successively when the complex aggregates themselves are defined and executed successively. The performance of this single data retrieval operation reduces the amount of processing power and resources required to perform a database retrieval or look-up, relative to the amount of processing power and resources to perform multiple, distinct database retrievals and look-ups. Additionally, there may be situations where multiple aggregates require the same data. As such, if these aggregates were performed successively, the data processing system would need to retrieve the same data multiple times, which is inefficient.

However, if the multiple, distinct aggregates are executed at the same time, then the data processing system can perform a single retrieval from the data base and use the retrieved data across multiple aggregates, which improves processing efficiency—relative to processing efficiency of retrieving the same data multiple times. For high-scale computing systems, even a small reduction in the bandwidth usage for a user results in a large performance improvement for the system overall.

The transform generator generates transforms that are enabled to compute multiple aggregates at the same time. This can enable improved logic in the transform for processing data from each of batch and real-time data sources. For example, multiple aggregates may rely on a common intermediate result for computing a given aggregate. The transform generator may improve the processing efficiency of computing two aggregates together, relative to a processing efficiency of computing each aggregate individually (e.g., in sequence). An intermediate computation can be computed once, and a result of that computation can be stored in memory for use in multiple complex aggregates.

In another example, the transform logic can be defined to streamline data access from either the batch data storage, the real-time data sources, or both. A data item that is used in multiple complex aggregates can be retrieved once and stored in memory for use in each of the multiple complex aggregates. In another example, all required data items used in each complex aggregate can be queried in a single query from the data processing system, enabling the data to be accessed in a single read operation. The batch data storage and/or the real-time data sources can thus process a single, comprehensive query and respond with all necessary data in a single response. This is more efficient relative to processing multiple queries, resulting in a performance improvement.

The user interface for the self-service complex aggregates guides the user for defining the complex aggregates by providing available inputs and aggregation options to the user in a dynamic way. The user is enabled to select a given label that is associated with an aggregate the user is defining. The user interface guides the user to select a label, associated with one or more datasets, which are available to the user. Once a label is selected, the user interface provides, to the user, available fields, conditions, and values for defining complex aggregates for datasets associated with that label. The user interface solves a combinatorial problem for the user. The user can be selecting from thousands of fields or more. The potential combinations of fields, conditions, and values for defining aggregates can be impractical to show to the user. The user interface generator removes irrelevant data and guides the user to defining complex aggregates that are logically sound. As a user makes decisions, further definition of the complex aggregates is guided to fields, conditions, and values that are available without conflicting logic.

The transform generator described herein enables modification of a portion of one or more graphs and prevents modification, by a non-technical user, of other portions of those one or more graphs. The user is only able to modify portions of the graphs that actually compute complex aggregates. Specifically, the user is enabled, through the user interface, to perform a guided modification of transform logic that computes the complex aggregates. For example, the user interface enables the user to define complex aggregates, but prevents the user from altering or modifying portions of the graph related to accessing or modifying the data catalog, batch data storage, real-time data sources, and so forth. The user is prevented from modifying portions of the graph that prepare data items from the batch data storage and the real-time data sources for use as inputs to the complex aggregation logic. For example, these portions of the graph can include access logic, sort logic, partition logic, join logic, filter logic, and so forth. Due to the constraints of the above-described guided modification, the amount of processing and execution errors (e.g., in execution of the graph) is reduced, relative to the amount of errors if the code was being generated manually. There is this reduction of errors because certain portions of the graph (or the computer program) cannot be modified and the portion that can be modified (through insertion of code that is generated from the user's interaction with complex aggregates UI) is error free or nearly error free since the system itself is generating the code. This reduction in error improves the efficiency in calculating the aggregates.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 6 is a flow diagram depicting calculation of aggregates.

DETAILED DESCRIPTION

Figure 1:
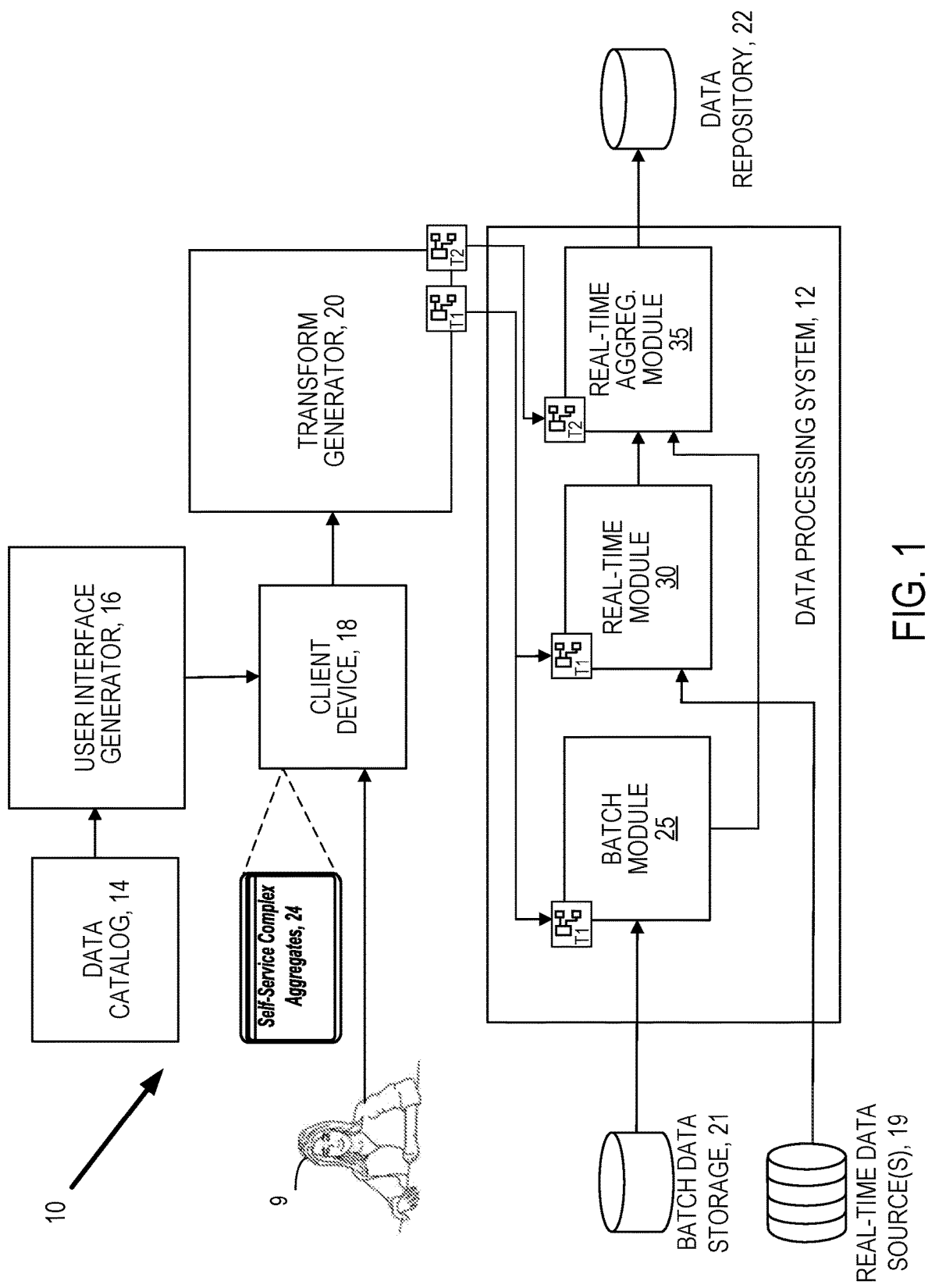
FIG. 1 is a block diagram of a system.

Referring to FIG. 1, a system 10 for self-service calculation of aggregates includes a data processing system 12 and a client device 18. The client device 18 renders (e.g., for a business user 9) a user interface, e.g., self-service complex aggregates interface 24. An aggregate is defined as an accumulation of data over a period of time.

A self-service complex aggregate is an aggregate that a user can produce as discussed herein. Through interface 24, user 9 selects which data sources (from across many disparate data sources enterprise wide) and fields (in those data sources) the user wants to aggregate. The system 10 then automatically generates code (e.g., generate a job) to access data across those disparate data sources and to generate that in real-time. The aggregation is "complex" because the aggregation can be across numerous, distinct and/or different data sources of an enterprise. The aggregation is self-service because system 10 automatically performs the code generation to generate the aggregate, based only on user selection of fields, rather than needing a technical user to generate the code for the aggregate. As a result, the system 10 can start producing results for the aggregate much more quickly.

The system 10 includes a data catalog 14. Generally, the data catalog 14 is a repository of identifiers (e.g., business or logical names or logical metadata) of data sets, fields and structured and unstructured data across an entire infrastructure—thereby allowing a user to more quickly find and identify its data. Generally, structured data includes data with a standard format and/or that includes (i.e., is structured) with fields. The identifiers in the data catalog 14 may be business names that are easy for a user to understand and provide semantic meaning. The data catalog 14 may also store technical identifiers (also known as technical metadata) for the datasets and fields and so forth. For example, this technical metadata may specify a technical field name, e.g., a field name as it appears in the data source itself. For each technical field name, the data catalog may store a logical or business name to enable a user to easily identify fields and datasets. In some examples, system 10 automatically transforms technical metadata to logical metadata (e.g., business names) by performing semantic discovery on data received from data sources, as described in US-2020-0380212, the entire contents of which are incorporated herein by reference. In this example, user 9 browses the data catalog 14 to identify which fields and datasets (e.g., structured data) are to be used in generating the aggregate. In particular, the user 9 browses the data catalog 14 by viewing, on client device 18, UI 24 (generated through user interface generator 16), which presents identifiers and visual representations representing the logical metadata and business names in data catalog 14.

The data catalog 14 feeds a user interface generator 16 and a client device 18 then feeds a transform generator 20. The transform generator 20 generates executable computer code in the form of transforms T1 and T2 for inclusion in computation graphs. The data processing system 12 receives the transforms T1 and T2. The transform T1 is sent to a batch module 25 and a real-time module 30, and the transform T2 is sent to a real-time aggregate module 35, which outputs data (e.g., a result) to data repository 22.

The system 10 also includes a batch data storage 21, e.g., a data warehouse that holds many, e.g., tens of thousands, tens of millions, tens of billions, etc. of records. In this example, batch module 25 retrieves data from batch data storage 21 (or a plurality of batch data storage or memory devices) at predetermined times, e.g., once a night. The retrieved data includes data structures that are structured with fields and with a value being included in the data structure and associated with a field. In turn, there may be a communication channel (not shown) between batch data storage 21 and real-time data source(s) 19, such that real-time data source(s) 19 maintain the data for a specified amount of time, e.g., 24 hours, and then transfers the last 24 hours of data to batch data storage 21. In some examples, batch data storage 21 includes a plurality of memory devices across an enterprise. The system 10 also includes a real-time data source(s) 19, e.g., a data source that sends real-time data records to the system 10.

Figure 2A:
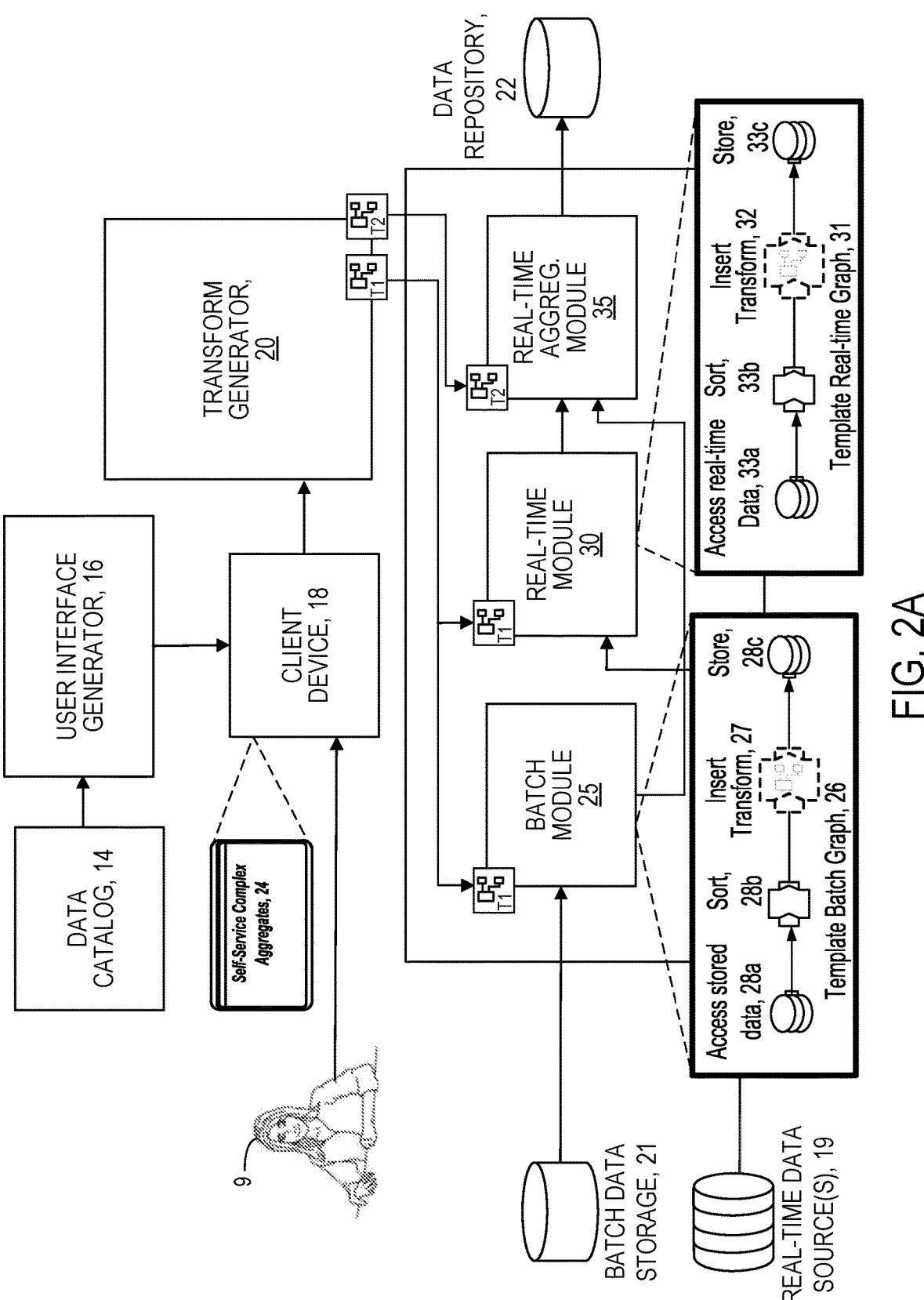
FIGS. 2A-2B are diagrams of the system of FIG. 1 in stages of aggregate definition.

Referring now to FIG. 2A, the batch module 25 stores a template batch graph 26, and the real-time module 30 stores a template real-time graph 31. The template batch graph 26 and the template real-time graph 31 include placeholders 27 and 32, respectively, for a transform T1 that will be generated by the transform generator 20. The system 10 also includes the other elements of FIG. 1 not specifically numbered in FIG. 2A.

The template batch graph 26 includes a component 28a to access stored data from the real-time data source(s) 19, a component that sorts 28b the accessed data according to a criteria, the placeholder 27 for transform T1, and a component that stores 28c the data.

The template real-time graph 31 includes a component to access 33a stored data from the real-time data source(s) 19, a component that sorts 33b the data according to a criteria, the placeholder component 32 for the transform T1, and a component that stores 33c the data.

Figure 2B:
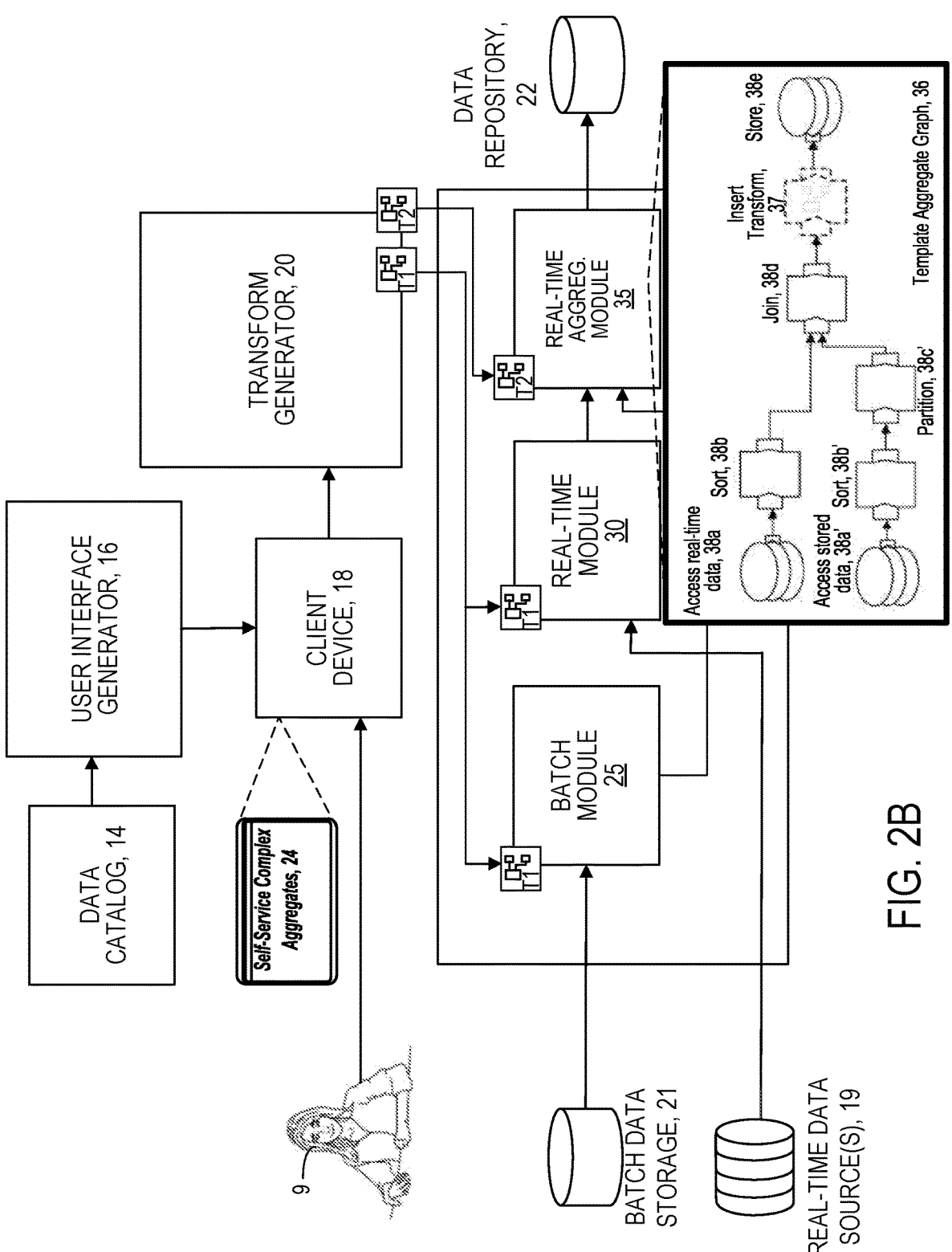

Referring now to FIG. 2B, the real-time aggregate module 35 stores a template aggregate graph 36. The template aggregate graph 36 includes the placeholder 37 for transform T2 that will be generated by the transform generator 20. The system 10 also includes the other elements of FIG. 1 not specifically numbered in FIG. 2B.

The template aggregate graph 36 also includes a component 38a to access stored data from the real-time data source(s) 19, a component that sorts 38b the data according to a criteria, the placeholder for the transform 37, and a component that stores 38e the data. The template aggregate graph 36 also includes a component to access stored data 38a' from the batch data storage 21, a component that sorts 38b' the data according to a criteria, a component that partitions the sorted batch data 38c,' a component that joins 38d the sorted, partitioned batch data with the sorted real-time data and the placeholder 37 for the transform T2. The data accessed from the real-time data source(s) includes data structures that are structured with fields, each associated with a value. The template aggregate graph 36 also includes a component that stores 38e the data. In some examples, the real-time module and/or the batch module include a parser to parse fields of data in the retrieved data structures to identify which fields (and associated values) are required for generating the complex aggregate.

Figure 3A:
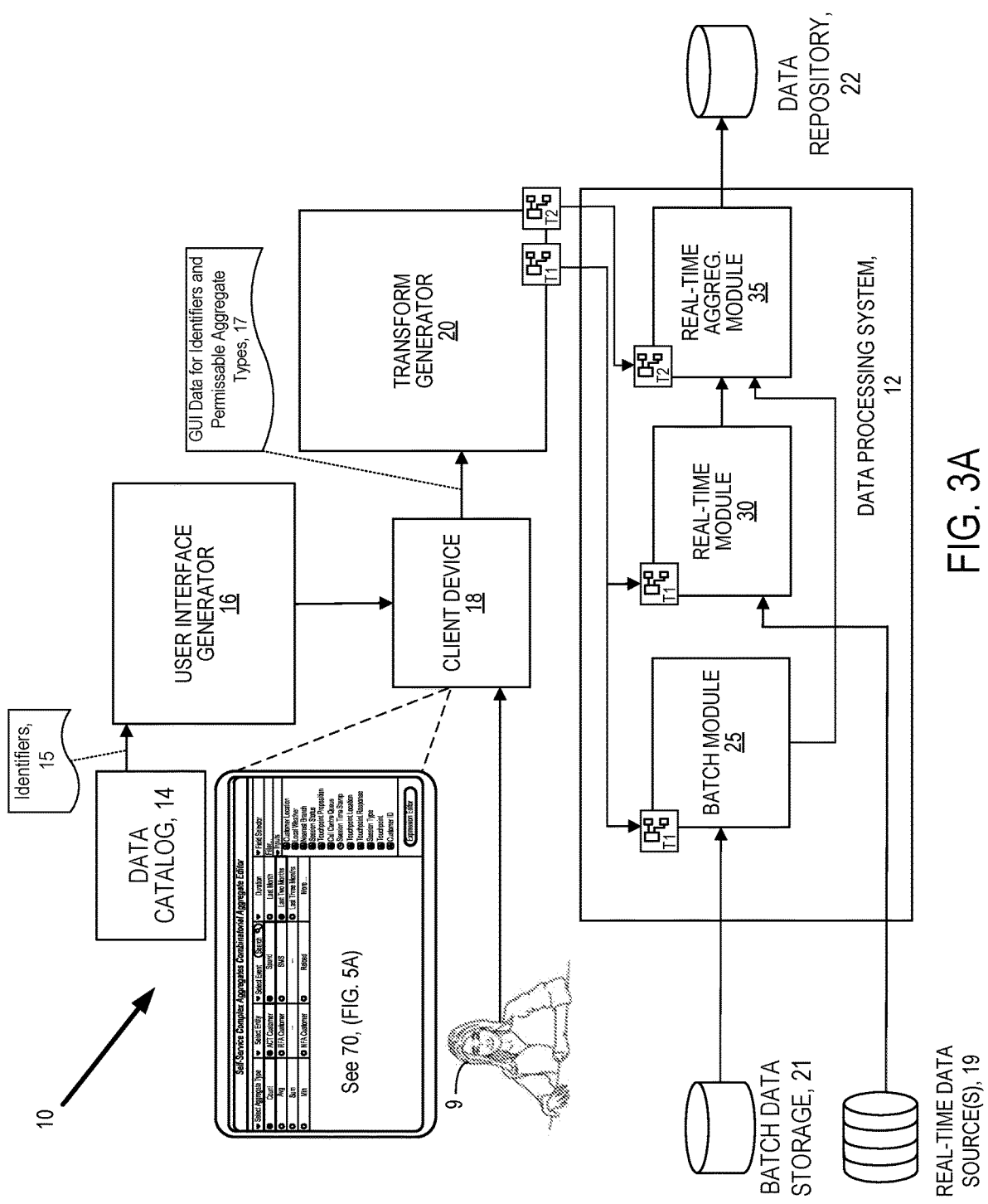
FIGS. 3A-3C are diagrams of the system of FIG. 1 in stages of aggregate definition.

Referring now to FIG. 3A, the system 10 is shown with the user interface generator 16 generating a graphical user interface (GUI) 70 (described in FIG. 5A) that transfers data to the client device 18. The client device 18 transfers user input data 17 from the GUI to the transform generator 20. The user input data includes identifiers 15 and permissible aggregate types such as string values. The transform generator 20 generates code as a transform T1 and a transform T2. The code is executable code that is transferred to the batch module 25, the real-time module 30 and the real-time aggregate module 35. The code transferred to the batch module 25 and the real-time module 30 is the transform T1, and the code transferred to the real-time aggregate module 35 is the transform T2. The system 10 also includes the other elements of FIG. 1 not specifically numbered in FIG. 3A.

Figure 3B:
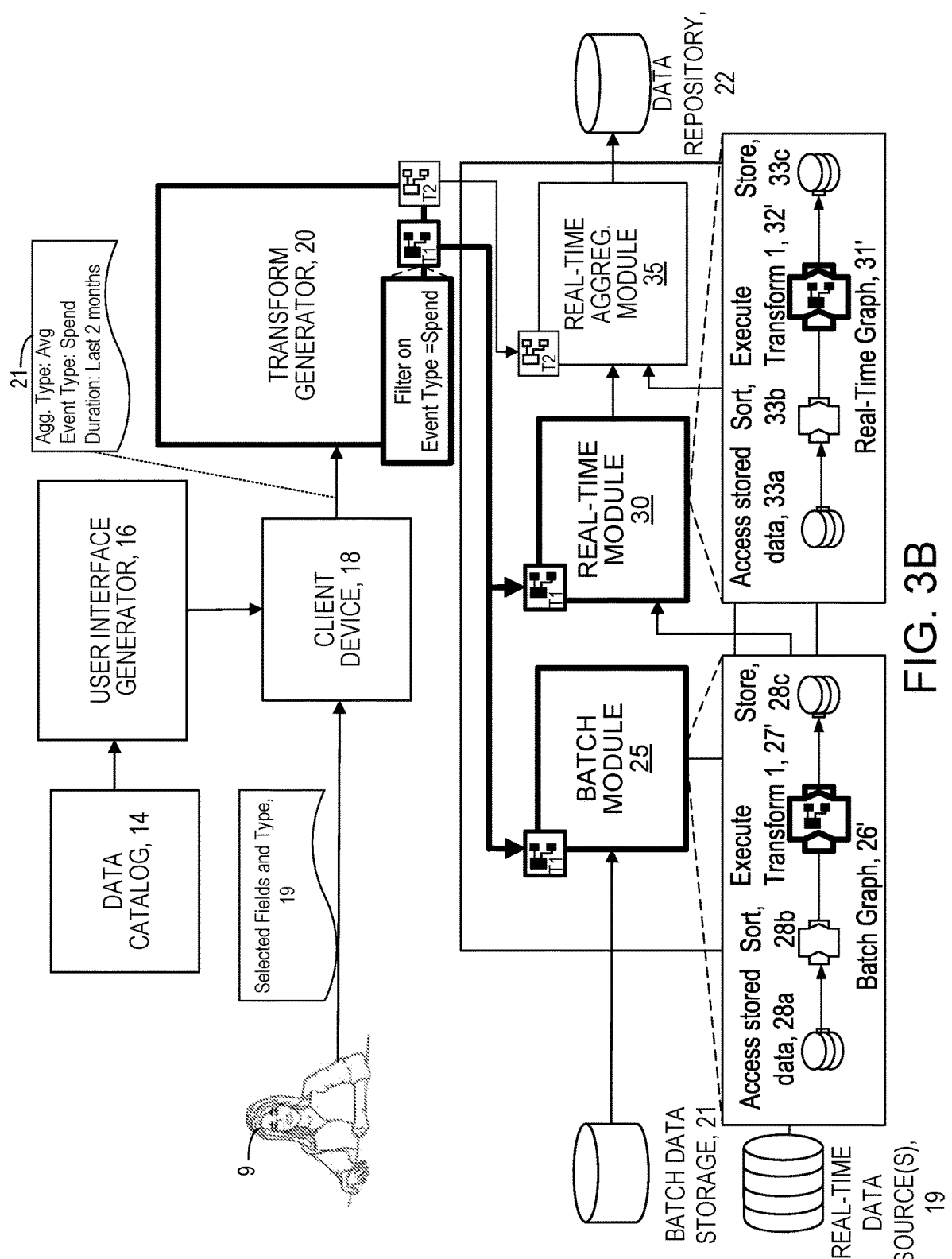

Referring now to FIG. 3B, the system 10 is shown, with the user 9, via the user interface generator 16, selecting fields and types from the generated GUI 70 (FIG. 5A) to input data into the client device 18. The client device 18 transfers the inputted data 19 of the selected fields and types entered in the GUI 70 to the transform generator 20. In this example, the client device 18 transfers input data 21 of Agg Type: Avg; Event Type: Spend; and Duration: Last 2 months, to the transform generator 20. The transform generator 20 generates code T1 corresponding to the selected fields and types for execution in the batch module 25 and the real-time module 30. In this example, the code generated is a transform T1 "Filter on Event Type=Spend." The transform T1 is transferred to the batch module 25 and the real-time module

30 and inserted by the batch module 25 and the real-time module 30 into the respective placeholders 27 and 32 in the template batch graph 26 (FIG. 2A) of the batch module 25 and the template real-time graph 31 (FIG. 2A) of the real-time module 30. Upon insertion of the transform T1 into the respective placeholders 27 and 32 provides batch graph 26' and real-time graph 31'. The system 10 also includes the other elements of FIG. 1 not specifically numbered in FIG. 3A.

The batch graph 26' causes the batch module 25 to access stored batch data 28a from the batch module 25, sort 28b the accessed batch data according to the sort criteria, execute 27' the transform T1, and store 28c the transformed data. The real-time graph 31' causes the real-time module 30 to access stored, real-time data 33a from the real-time module 30, sort 33b the accessed real-time data, execute 32' the transform T1, and store 33c the transformed data.

Figure 3C:
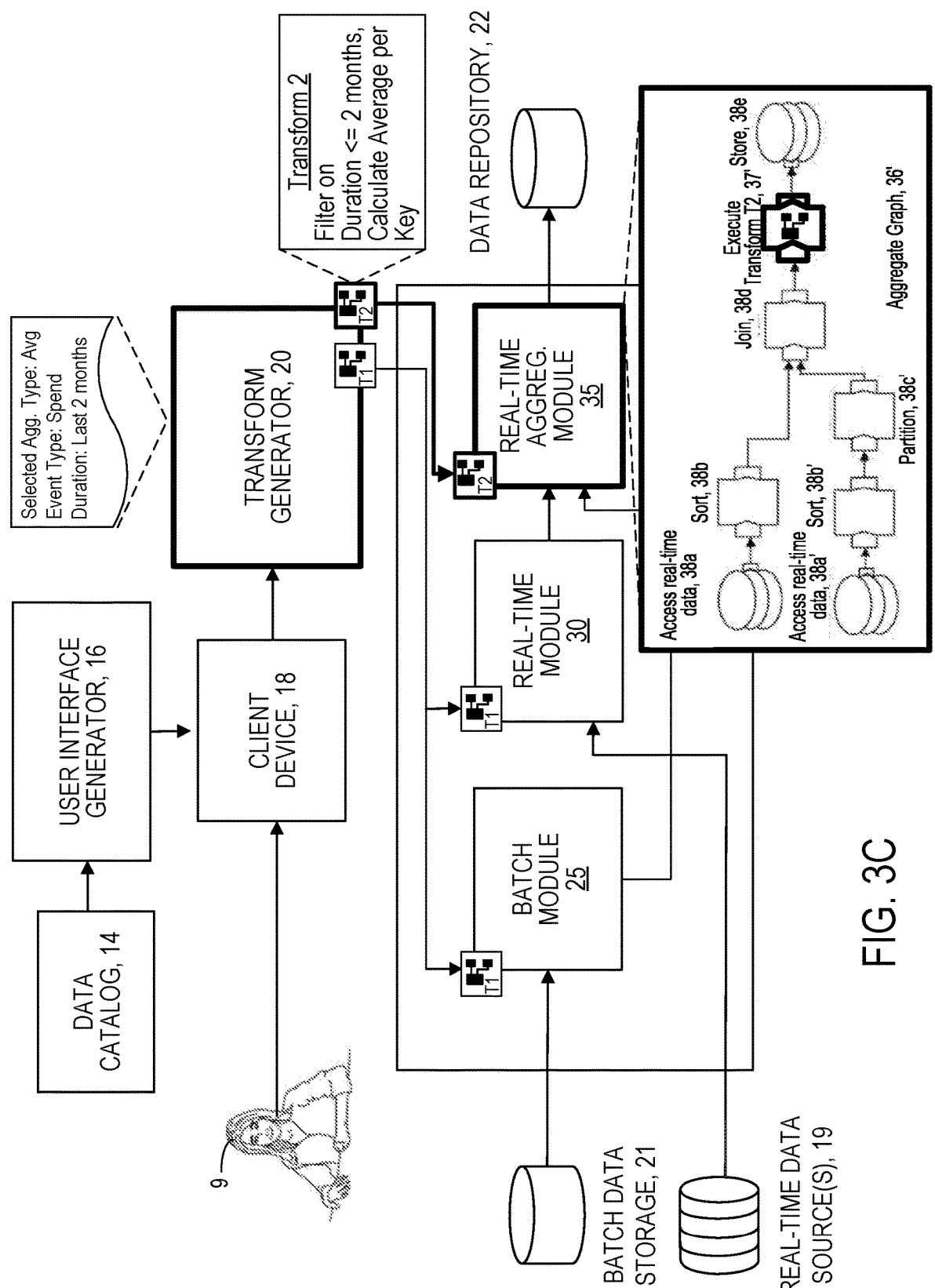

Referring now to FIG. 3C, the system 10 is shown with the transform generator 20 having generated transform T1 corresponding to the selected fields and types for execution in the batch module 25 and the real-time module 30. The transform generator 20 also generated transform T2 for use by the real-time aggregate module 35. The transform T2 generated is "Filter on Duration≤2 months Calculate Average per Key." The transform T2 is transferred to real-time aggregate module 35 and inserted by the real-time aggregate module 35 into the placeholder 37 in the template aggregate graph 36 (FIG. 2B) of the real-time aggregate module 35. Insertion of the transform T2 into the placeholder 37 provides aggregate graph 36'. The system 10 also includes the other elements of FIG. 1 not specifically numbered in FIG. 3C.

The aggregate graph 36' causes the real-time aggregate module 35 to access 38a real-time data from the real-time module 30, and sort 38b the accessed real-time data according to the sort criteria. The aggregate graph 36' also causes the real-time aggregate module 35 to access 38a' the batch data from the batch module 25, sort 38b' the accessed batch data according to the sort criteria, and partition 38c' the sorted batch data. The aggregate graph 36' causes the real-time aggregate module 35 to join 38d the sorted real-time data with the partitioned batch data and execute 37' the transform T2 on the joined data and store 38e the transformed, joined data.

Figure 4:
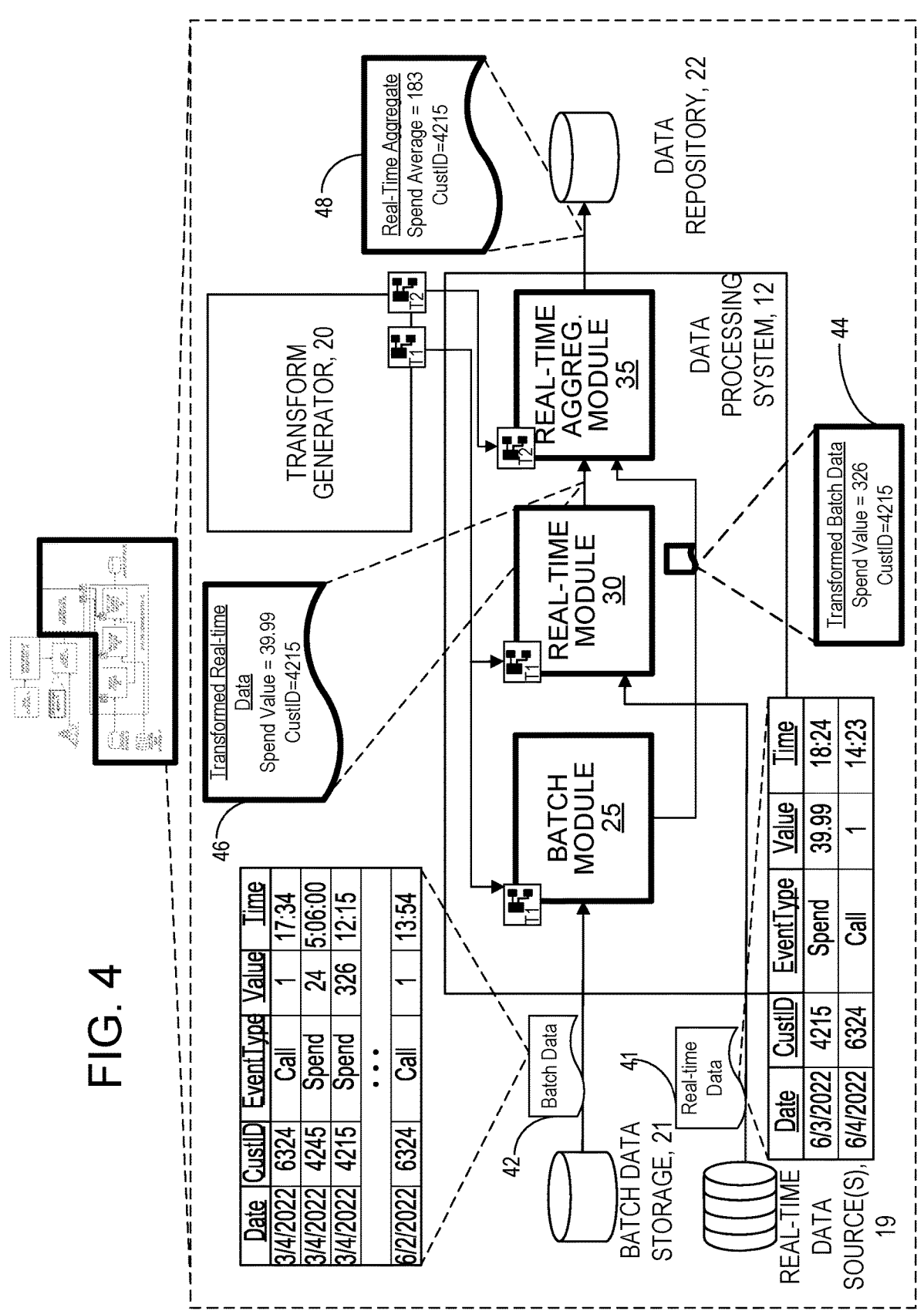
FIG. 4 is a diagram showing the transformation module construction of a dataflow graph.

Referring now to FIG. 4, an example of operation of the self-service aggregate is shown. FIG. 4 shows a portion of the data processing system 12 of FIG. 1. FIG. 4 shows the batch module 25, the real-time module 30 and the real-time aggregate module 35 loaded with transform T1 for the batch module 25 and the real-time module 30, and loaded with the transform T2 for the real-time aggregate module 35. The batch module 25 receives batch data from the batch data storage 21. The batch module 25 receives batch data 42, as shown in the below Table 1:

TABLE 1

| Date | CustID | Event Type | Value | Time |
| --- | --- | --- | --- | --- |
| Mar. 4, 2022 | 6324 | Call | 1 | 17:34 |
| Mar. 4, 2022 | 4245 | Spend | 24 | 5:06:00 |
| Mar. 4, 2022 | 4215 | Spend | 326 | 12:15 |
| | | . . . | | |
| Jun. 2, 2022 | 6324 | Call | 1 | 13:54 |

The real-time module 30 receives real-time data 41, as shown below in Table 2:

TABLE 2

| Date | CustID | Event Type | Value | Time |
|------|--------|-----------|-------|------|
| Jun. 3, 2022 | 4215 | Spend | 39.99 | 18:24 |
| Jun. 4, 2022 | 6324 | Call | 1 | 14:23 |

In order to determine the real-time aggregate, the data processing system 12 causes the batch module 25 to access 28*a* the batch data from Table 1, sort 28*b* the batch data, transform 27' the batch data, and store 28*c* the transformed data. The batch module 25 outputs transformed batch data 44, as:

"Spend Value=326; Cust. ID=4215."

The data processing system 12 also causes the real-time module 30 to access 33*a* the real-time data of Table 2, sort 33*b* the real-time data, transform 32' the sorted, real-time data and store 33*c* the transformed data. The real-time module 30 outputs the transformed real-time data 46, as:

"Spend Value=39.99; Cust. ID=4215."

The real-time aggregate module 35 receives the transformed batch data 44 "Spend Value=326; Cust. ID=4215," from the batch module 25 and the transformed real-time data 46 "Spend Value=39.99; Cust. ID=4215," from the real-time module 30. The real-time aggregate module 35 computes the spend average for customer identifications and outputs the real-time aggregate 48, as:

"Spend Average=183; Cust. ID=4215."

Figure 5A:
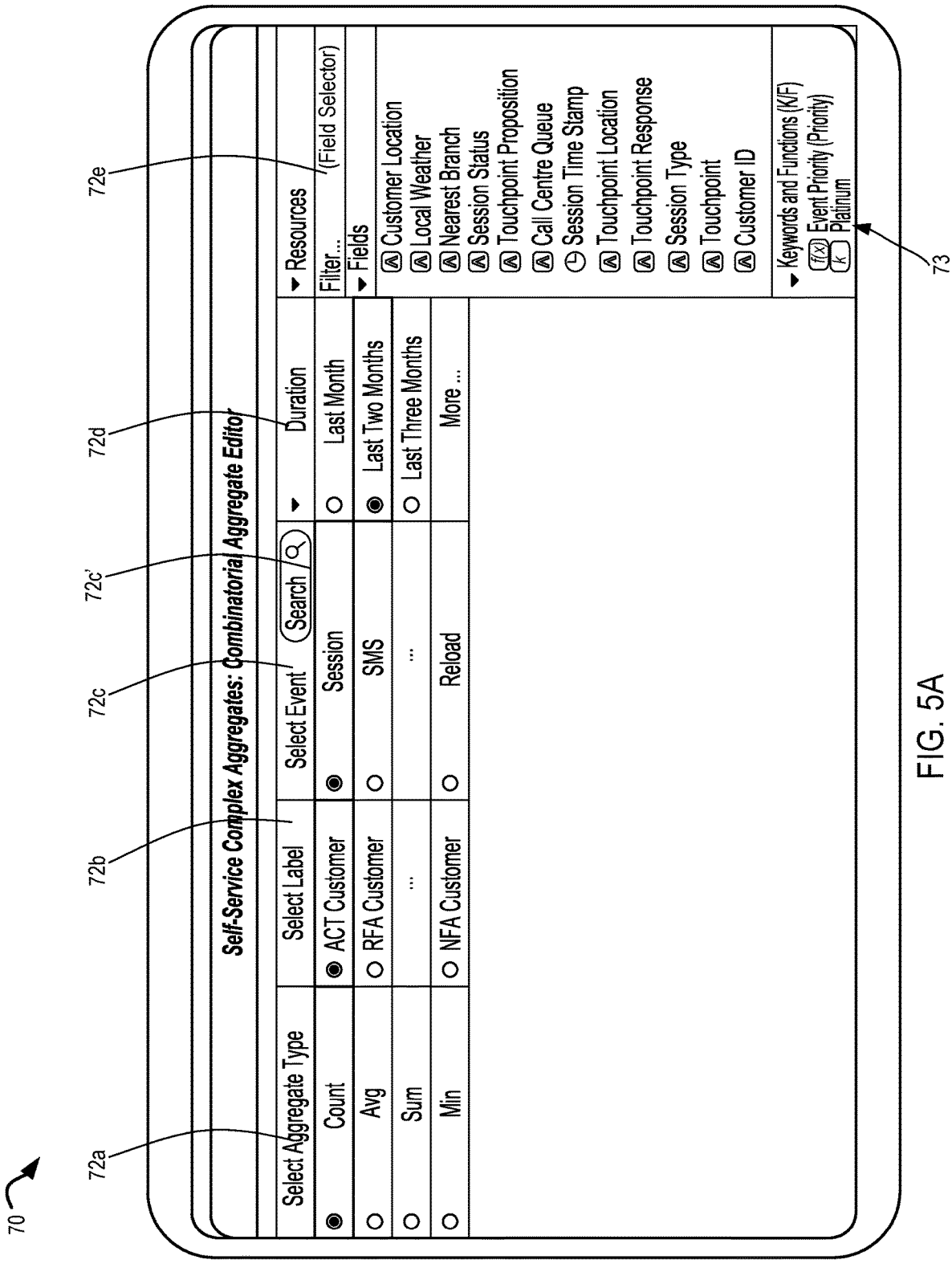
FIGS. 5A-5B are diagrams depicting user interfaces.

Referring now to FIG. 5A, an example of the graphical user interface (GUI) 70 (referred to in FIG. 1) is shown. The GUI 70 is a self-service complex aggregates combinatorial aggregate editor. The data processing system 12 causes the functions provided in the GUI 70. The GUI 70 includes five columns and a number of rows. The GUI 70 is useful for configuring the data processing system 12 to handle various and numerous types of aggregations from various sources of data. As discussed above, modern data processing systems manage vast amounts of data within an enterprise. A large institution, for example, may have many millions (or even billions) of datasets. These datasets can support multiple aspects of the operation of the enterprise. The GUI 70 allows a user to easily produce complex aggregates based on selections of different values in each of the columns.

A first column 72*a* is "Select Aggregate Type." This column allows a user to select aggregate type as count, average (avg.), sum and min. Additional rows such as max. etc. can be included for selection of other types. Accordingly, the subject matter is not limited to these examples.

A second column 72*b* is "Select Label." This column allows a user to select a label specifying a customer type, such as ACT Customer, RFA Customer and NFA Customer. Additional rows of different customer types can be included. Accordingly, the subject matter is not limited to these examples.

A third column 72*c* is "Select Event." This column allows a user to select events such as Session, SMS and Reload. Additional rows can be included. Accordingly, the subject matter is not limited to these examples. The third column also includes a search box 72*c'* that allows a user to search for additional events.

A fourth column 72*d* is "Duration." This column allows a user to select duration or range of time over which records are selected for processing. Examples include "Last Month," "Last Two Months," "Last Three Months," and "More." That is, additional rows of different durations can be included. Accordingly, the subject matter is not limited to these examples.

A fifth column 72*e* is "Field Selector." This column allows a user to select a filter that is applied to processed records. The filters can be of various types, such as "Customer Location," "Local Weather," "Nearest Branch," etc. Many other filters can be included. Accordingly, the subject matter is not limited to these examples. The GUI 70 also includes a keywords and functions 73 section that when selected causes the data processing system 12 to search for records containing the keywords and functions 73.

Figure 5B:
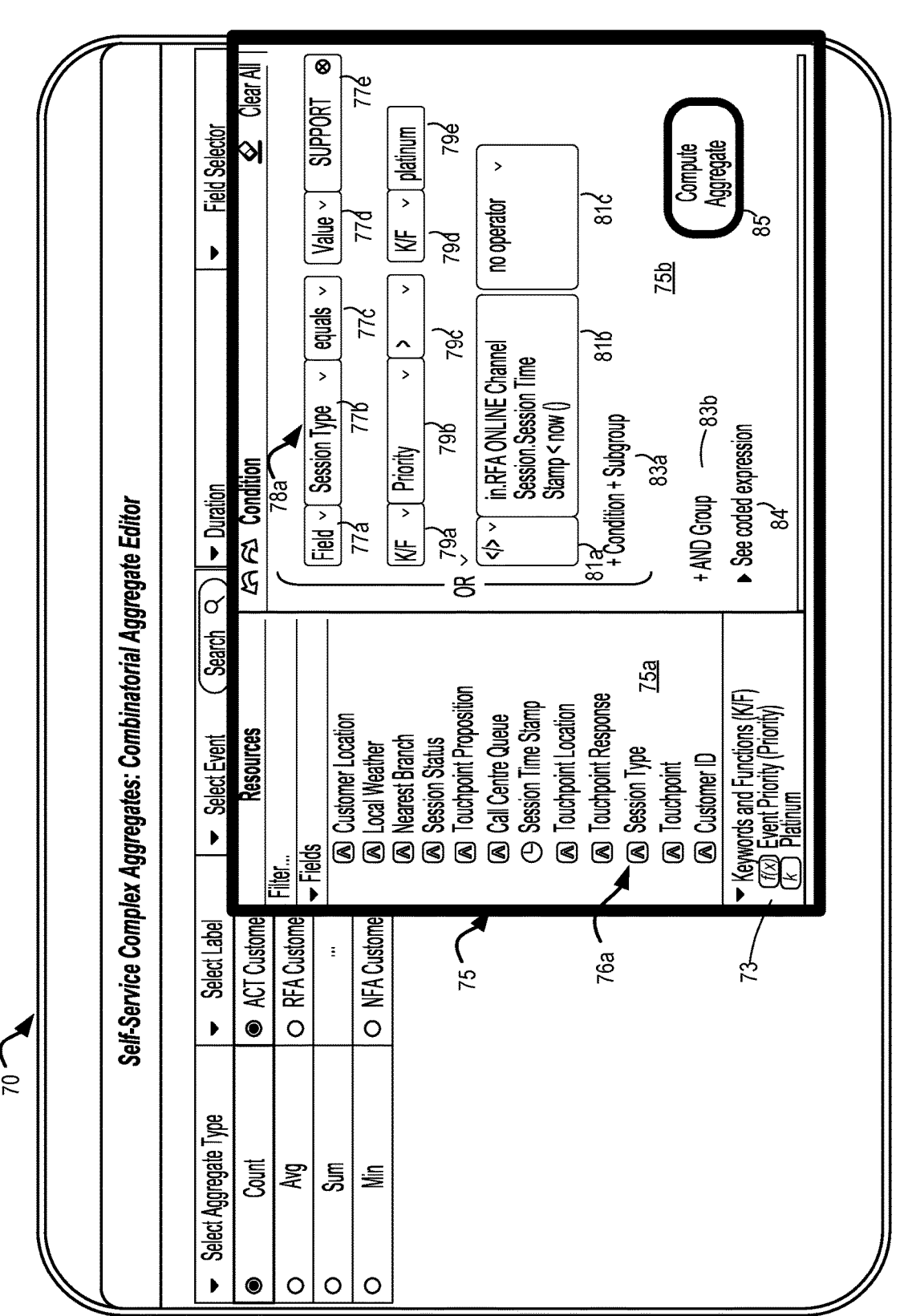

Referring now to FIG. 5B, the GUI 70 is shown with an overlaid pop-up window 75 that results from selection of a filter in FIG. 5A. The pop-up window 75 shows in a first portion 75*a* the filter inputs "Customer Location," "Local Weather," "Nearest Branch," etc., and includes in a second portion, filter configurator 75*b* that can be used to specify a condition. Each event includes at least some, if not all, of the fields in pop-up window 75.

When a given field in the pop-up window 75 is selected, the filter configurator 75*b* configures a field selector column 77*b* with the given field. The filter configurator 75*b* also includes a field selector 77*a* and a mathematical operator 77*c*, e.g., equals, less than, greater than, etc. The filter configurator 75*b* also includes a value selector 77*d* and a value 77*e*. The filter configurator 75*b* also includes a section to configure the portion keywords and functions 73 of FIG. 5A.

FIG. 5B shows the K/F field 79*a*, with an indicator field 79*b* "priority," and a second K/F field 79*d* with a label field 79*e* "platinum," corresponding to the values in the keywords and functions 73 section (FIG. 5A) "priority" and "platinum." FIG. 5B shows an evaluation field 79*c* or mathematical operator 79*c*, e.g., equals, less than, greater than, etc. FIG. 5B also shows a custom coding field 81*a*, with an input portion 81*b* (for inputting code), and an operator field 81*c*.

Thus, in FIG. 5B, session type 76*a* is selected, which causes the condition portion 75*b* to register "session type" in the field selector column 77*b*. K/F is selected as priority and K/F is selected as platinum. The mathematical operator field 81*a* has a greater than or a less than and the indicator field 81*b* has in.RFA ONLINE Channel Session.Session Time Stamp<now ( ).

The operator field 81*c* shows no operator.

The pop-up window 75 also includes +Condition+Subgroup sections 83*a* and +AND Group section 83*b*. Also, included is a control 84 to view the coded expression.

The pop-up window 75 also includes a control 85 to compute the aggregate, according to the selected filters and the fields selected in the self-service complex aggregates combinatorial aggregate editor (FIGS. 5A, 5B).

Referring now to FIG. 6, the data processing system 12 enables a user to generate the self-service complex aggregate (e.g., on their own) by providing the user with the GUI 70 that displays data items in the data catalog 14. The GUI 70 provides controls for the user to select data items to be used in generating the self-service complex aggregate, with the controls also enabling the user to select a type of aggregation. Based on the user's selections, the data processing system 12 automatically generates computer instructions to generate a value of the self-service complex aggregate that the user had selected.

The generation of the self-service complex aggregate 150 further includes accessing 152 identifiers of a plurality of data items from a data catalog and displaying 154 the graphical user interface that provides first visual representations of the identifiers accessed from the data catalog, with the identifiers representing candidate inputs for defining an aggregation. The generation of the self-service complex aggregate 150 further includes displaying 156, in the graphical user interface, one or more first controls for specifying which of the candidate inputs are selected for defining the self-service complex aggregate, with a first control specifying which of the candidate inputs are selected by enabling selection of a first visual representation, and with a selected, first visual representation specifying an identifier selected for defining the self-service complex aggregate.

The generation of self-service complex aggregate 150 further includes displaying 158, in the graphical user interface, one or more second visual representations of one or more types of aggregations that are permissible for aggregating the data items and displaying 160, in the graphical user interface, one or more second controls for specifying which type of aggregation is selected, with a second control specifying which type of aggregation is selected by enabling selection of a second visual representation.

Based on first visual representations selected by at least one of the one or more first controls and one or more second visual representations selected by at least one of the one or more second controls, the self-service complex aggregate 150 further includes generating 162, by the data processing system 12, executable computer instructions to detect data items identified by one or more identifiers represented by the selected first visual representations, and based on the detected data items, generate a value of an aggregation of a type represented by a selected second visual representation. The self-service complex aggregate 150 further includes storing 164, in memory, the computer instructions.

Generally, an "entity" includes a portion of a computer program (e.g., a predefined portion of a computer program for inclusion in another computer program) or one or more dataflow graph components (e.g., that are encapsulated together into a predefined module). Throughout this document, an "entity" may also be referred to as a "module," without limitation and for purposes of convenience.

Dataflow graph components include data processing components and/or datasets. A dataflow graph can be represented by a directed graph that includes nodes or vertices, representing the dataflow graph components, connected by directed links or data flow connections, representing flows of work elements (i.e., data) between the dataflow graph components. The data processing components include code for processing data from at least one data input, e.g., a data source and providing data to at least one data output, e.g., a data sink of the system 10. The dataflow graph can thus implement a graph-based computation performed on data flowing from one or more input data sets through the graph components to one or more output data sets.

System 10 also includes the data processing system 12 for executing one or more computer programs (such as dataflow graphs), which were generated by the transformation of a specification into the computer program(s) using the transform generator 20 and techniques described herein. The transform generator 20 transforms the specification into the computer program that implements the plurality of modules. In this example, the selections made by user 9 through the user interfaces described here form a specification that specify which fields and datasets are used in the complex aggregation. Based on the specification, the transforms described herein are generated.

The data processing system 12 may be hosted on one or more general-purpose computers under the control of a suitable operating system, such as the UNIX operating system. For example, the data processing system 12 can include a multiple-node parallel computing environment including a configuration of computer systems using multiple central processing units (CPUs), either local (e.g., multiprocessor systems such as SMP computers), or locally distributed (e.g., multiple processors coupled as clusters or MPPs), or remotely distributed (e.g., multiple processors coupled via LAN or WAN networks), or any combination thereof.

The batch module 25, the real-time module 30 and the real-time aggregate module 35 (FIG. 1) executes computation graphs, as described above and the transform generator 20, generates transforms T1 and T2 for inclusion in the computation graphs generated by the batch module 25, the real-time module 30 and the real-time aggregate module 35.

In some examples, an entity includes dataflow components corresponding to nodes that are coupled by data flows corresponding to links. In this example, the computer program is a dataflow graph including entities corresponding to nodes that are coupled by data flows corresponding to links. In this example, the memory includes volatile or non-volatile memory. Additionally, in some examples, the entity includes one or more other entities.

The graph configuration approach described above can be implemented using software for execution on a computer. For instance, the software forms procedures in one or more computer programs that execute on one or more systems 10, e.g., computer programmed or computer programmable systems (which may be of various architectures such as distributed, client/server, or grid) each including at least one processor, at least one data storage system (including volatile and non-volatile memory and/or storage elements), at least one input device or port, and at least one output device or port. The software may form one or more modules of a larger computer program, for example, that provides other services related to the design and configuration of dataflow graphs. The nodes and elements of the graph can be implemented as data structures stored in a computer readable medium or other organized data conforming to a data model stored in a data repository.

The software may be provided on a storage medium, such as a CD-ROM, readable by a general or special purpose programmable computer or delivered (encoded in a propagated signal) over a communication medium of a network to the computer where it is executed. All of the functions may be performed on a special purpose computer, or using special-purpose hardware, such as coprocessors. The software may be implemented in a distributed manner in which different parts of the dataflow specified by the software are performed by different computers. Each such computer program is preferably stored on or downloaded to a storage media or device (e.g., solid state memory or media, or magnetic or optical media) readable by a general or special purpose programmable computer, for configuring and operating the computer when the storage media or device is read by the system 10 to perform the procedures described herein. The system 10 may also be considered to be implemented as a computer-readable storage medium, configured with a computer program, where the storage medium so configured causes the system 10 to operate in a specific and predefined manner to perform the functions described herein.

Example Computing Environment

Figure 7:
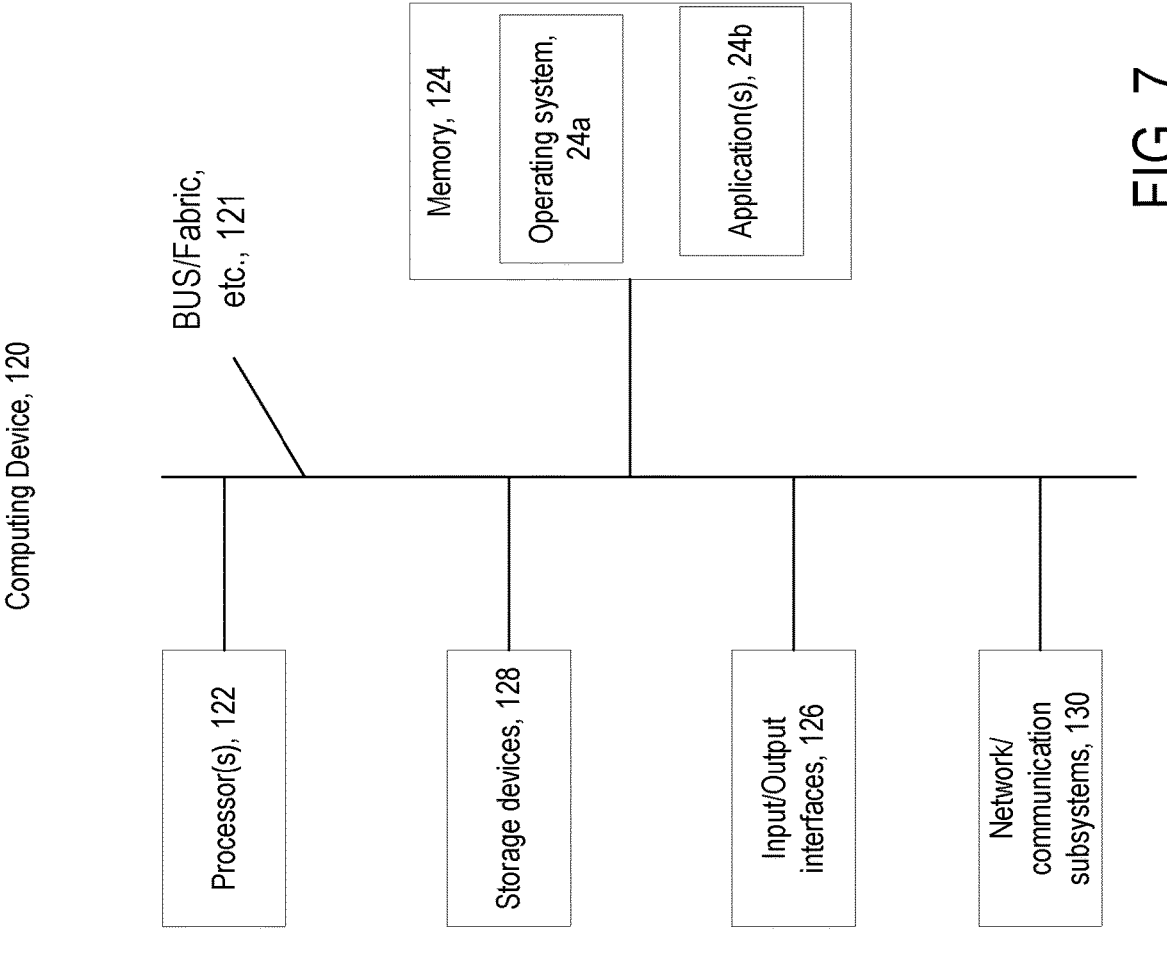
FIG. 7 is a diagram showing details of a computer system, such as a data processing system.

Referring to FIG. 7, an example operating environment for implementing embodiments of the present invention is shown and designated generally as computing device 120. Essential elements of a computing device 120 or a computer or data processing system or client or server are one or more programmable processors 122 for performing actions in accordance with instructions and one or more memory devices 124 for storing instructions and data. Generally, a computer will also include, or be operatively coupled, (via bus 21, fabric, network, etc.) to I/O components 126, e.g., display devices, network/communication subsystems, etc. (not shown) and one or more mass storage devices 128 for storing data and instructions, etc., and a network communication subsystem 130, which are powered by a power supply (not shown). In memory 124, are an operating system 24*a* and application(s) 24*b* for application programming.

Devices suitable for storing computer program instructions and data include all forms of non-volatile memory, media and memory devices including by way of example, semiconductor memory devices (e.g., EPROM, EEPROM, and flash memory devices), magnetic disks (e.g., internal hard disks or removable disks), magneto optical disks, and CD ROM and DVD-ROM disks. The processor and the memory can be supplemented by, or incorporated in, special purpose logic circuitry.

To provide for interaction with a user, embodiments of the subject matter described in this specification are implemented on a computer having a display device (monitor) for displaying information to the user and a keyboard, a pointing device, (e.g., a mouse or a trackball) by which the user can provide input to the computer. In addition, a computer can interact with a user by sending documents to and receiving documents from a device that is used by the user (for example, by sending web pages to a web browser on a user's user device in response to requests received from the web browser).

Embodiments of the subject matter described in this specification can be implemented in a computing system that includes a back end component (e.g., as a data server), or that includes a middleware component (e.g., an application server), or that includes a front end component (e.g., a user computer having a graphical user interface or a Web browser through which a user can interact with an implementation of the subject matter described in this specification), or any combination of one or more such back end, middleware, or front end components. The components of the system can be interconnected by any form or medium of digital data communication (e.g., a communication network). Examples of communication networks include a local area network ("LAN") and a wide area network ("WAN"), an internetwork (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments, and it should be understood that the described program components and systems can generally be integrated together in a single software product or packaged into multiple software products.

A number of embodiments have been described. Nevertheless, it will be understood that various modifications may be made without departing from the spirit and scope of the techniques described herein. For example, some of the steps described above may be order independent, and thus can be performed in an order different from that described. Additionally, any of the foregoing techniques described with regard to a dataflow graph can also be implemented and executed with regard to a program. Accordingly, other embodiments are within the scope of the following claims.

What is claimed is:

1. A method implemented by a data processing system for providing a user with a graphical user interface that displays data items in a data catalog and that provides controls for the user to select data items to be used in generating one or more aggregations, wherein the controls also enable the user to select a type of aggregation, and based on user's selections, automatically generating computer instructions to generate a value of the one or more aggregations that the user had selected, the method including:

accessing, from a data catalog, names of fields of datasets of a plurality of data sources, with a dataset including multiple data elements, each data element structured with fields;

displaying a graphical user interface that provides first visual representations of at least a plurality of the names of the fields of the datasets of the plurality of data sources accessed from the data catalog, with the at least the plurality of the names representing candidate inputs for defining an aggregation;

displaying, in the graphical user interface, one or more first controls for specifying which of the candidate inputs represented by the at least the plurality of the names accessed from the data catalog are selected for defining the aggregation;

wherein a first control specifies which of the candidate inputs are selected by enabling selection of a first visual representation, wherein a selected, first visual representation specifies a name of a field of a dataset of the plurality of data sources selected for defining the aggregation;

identifying first visual representations selected by at least one of the one or more first controls;

identifying, by a data processing system executing logic, names of fields represented by the selected first visual representations;

based on the identified names of fields, determining one or more types of aggregations that are permissible for aggregating data items associated with the identified names of the fields, wherein a type of aggregation is associated with one or more names of one or more fields;

displaying, in the graphical user interface, one or more second visual representations of the one or more types of aggregations that are permissible for aggregating the data items;

displaying, in the graphical user interface, one or more second controls for specifying which type of aggregation is selected;

wherein a second control specifies which type of aggregation is selected by enabling selection of a second visual representation;

whereby the graphical user interface provides for selection of one or more resources;

in response to selection of at least one of the resources, displaying, in the graphical user interface, one or more third visual representations of fields associated with the at least one of the resources selected;

based on first visual representations selected by at least one of the one or more first controls, one or more second visual representations selected by at least one of the one or more second controls and at least a selected one of the one or more third visual representations, generating, by the data processing system, computer instructions that are executable to:

detect data items identified by one or more of the names represented by the selected first visual representations; and based on the detected data items and the at least selected one of the one or more third visual representations, generate one or more values of one or more aggregations of one or more types represented by one or more selected second visual representations; and storing, in memory, the computer instructions.

2. The method of claim 1, further including:

based on the first visual representations selected by the at least one of the one or more first controls and the one or more second visual representations selected by the at least one of the one or more second controls, generating a definition of the aggregation;

wherein the definition specifies names represented by the selected first visual representations, and wherein the definition specifies a type represented by the one or more selected second visual representations.

3. The method of claim 1, wherein the detecting of data items identified by one or more names represented by the selected first visual representations includes detecting a first item from a first data source and a second data item from a second data source, wherein the first and second data items are identified by one or more names represented by the selected first visual representations, and wherein the first and second data sources are distinct and/or different data sources; and wherein the generating of the one or more values of the one or more aggregations of the one or more types represented by the one or more selected second visual representations includes generating the values of the aggregations of the types represented by the selected second visual representations based on the detected first and second data items.

4. The method of claim 1, the generating of the computer instructions further including:

generating a first transform based on the selected first visual representations, wherein the first transform is configured to be inserted into one or more placeholders in one or more pre-configured templates of one or more computation graphs.

5. The method of claim 4, the generating of the computer instructions further including:

generating a second transform based on the selected second visual representation, wherein the second transform is configured to be inserted into a placeholder in the one or more pre-configured templates of the one or more computation graphs.

6. The method of claim 5, the generating of the computer instructions further including:

inserting the first transform and the second transform into the respective placeholders in the one or more pre-configured templates of the one or more computation graphs for generating the aggregation.

7. The method of claim 4, wherein the one or more templates of the one or more computation graphs include a template batch graph, wherein the template batch graph includes a placeholder for insertion of the first transform such that the template batch graph with the first transform inserted into the placeholder of the template batch graph is configured to perform, in predetermined time intervals, batch retrieval from disk of data items used for the one or more aggregates.

8. The method of claim 7, wherein the batch retrieval from disk of the data items is performed by querying the data items in a single query from the disk.

9. The method of claim 7, wherein the one or more templates of the one or more computation graphs include a template real-time graph, and wherein the template real-time graph includes a placeholder for insertion of the first transform, such that the template real-time graph with the first transform inserted into the placeholder of the template real-time graph is configured to perform real-time retrieval from memory of data items used for the one or more aggregates.

10. The method of claim 9, wherein the memory is volatile memory.

11. The method of claim 9, wherein the real-time retrieval from memory of the data items is performed by querying the data items in a single query from the memory.

12. The method of claim 9, wherein the one or more templates of the one or more computation graphs further include a template aggregate graph, which includes a placeholder for insertion of the second transform.

13. The method of claim 12, wherein the template aggregate graph is connected with the output of the template batch graph and the output of the template real-time graph such that, with the second transform inserted into the placeholder of the template aggregate graph, results of the batch retrieval are supplemented with results from the real-time retrieval to generate one or more values of one or more aggregations of one or more types represented by one or more selected second visual representations.

14. The method of claim 1, further including:

in response to receiving a request for the aggregate, executing the stored computer instructions to detect data items identified by one or more names represented by the selected first visual representations and to generate the one or more values of the one or more aggregations of the one or more types represented by the one or more selected second visual representations based on the detected data items.

15. The method of claim 14, further including:

wherein the one or more aggregates include multiple aggregates, and the computer instructions are configured such that the data items used for the multiple aggregates are to be queried in a single query from one or more data storages.

16. The method of claim 1, wherein the displaying, in the graphical user interface, of the one or more second visual representations of the one or more types of aggregations that are permissible for aggregating the data items is based on the selected first visual representation, preferably such that only second visual representations of types of aggregations that are permissible for aggregating the data items identified by the names identifier that are specified by the selected first visual representation are displayed in the graphical user interface.

17. The method of claim 1, further including:

displaying, in the graphical user interface, one or more third controls for specifying a duration over which the aggregation is generated.

18. The method of claim 17, further including:

displaying, in the graphical user interface, one or more fourth controls for specifying an event type over which the aggregation is generated.

19. The method of claim 1, wherein the data catalog is distinct from the plurality of data sources.

20. A data processing system for providing a user with a graphical user interface that displays data items in a data catalog and that provides controls for the user to select data items to be used in generating one or more aggregations, wherein the controls also enable the user to select a type of aggregation, and based on user's selections, automatically generating computer instructions to generate a value of the one or more aggregations that the user had selected, the data processing system including:

one or more processors; and one or more machine-readable hardware storage devices storing instructions that are executable by the one or more processors to perform actions of:

accessing, from a data catalog, names of fields of datasets of a plurality of data sources, with a dataset including multiple data elements, each data element structured with fields;

displaying a graphical user interface that provides first visual representations of at least a plurality of the names of the fields of the datasets of the plurality of data sources accessed from the data catalog, with the at least the plurality of the names representing candidate inputs for defining an aggregation;

displaying, in the graphical user interface, one or more first controls for specifying which of the candidate inputs represented by the at least the plurality of the names accessed from the data catalog are selected for defining the aggregation;

wherein a first control specifies which of the candidate inputs are selected by enabling selection of a first visual representation, wherein a selected, first visual representation specifies a name of a field of a dataset of the plurality of data sources selected for defining the aggregation;

identifying first visual representations selected by at least one of the one or more first controls;

identifying, by a data processing system executing logic, names of fields represented by the selected first visual representations;

based on the identified names of fields, determining one or more types of aggregations that are permissible for aggregating data items associated with the identified names of the fields, wherein a type of aggregation is associated with one or more names of one or more fields;

displaying, in the graphical user interface, one or more second visual representations of the one or more types of aggregations that are permissible for aggregating the data items;

displaying, in the graphical user interface, one or more second controls for specifying which type of aggregation is selected;

wherein a second control specifies which type of aggregation is selected by enabling selection of a second visual representation;

whereby the graphical user interface provides for selection of one or more resources;

in response to selection of at least one of the resources, displaying, in the graphical user interface, one or more third visual representations of fields associated with the at least one of the resources selected;

based on first visual representations selected by at least one of the one or more first controls, one or more second visual representations selected by at least one of the one or more second controls and at least a selected one of the one or more third visual representations, generating, by the data processing system, computer instructions that are executable to:

detect data items identified by one or more of the names represented by the selected first visual representations; and based on the detected data items and the at least selected one of the one or more third visual representations, generate one or more values of one or more aggregations of one or more types represented by one or more selected second visual representations; and storing, in memory, the computer instructions.

21. The data processing system of claim 20 wherein the data processing system is configured to further performs the actions of:

based on the first visual representations selected by the at least one of the one or more first controls and the one or more second visual representations selected by the at least one of the one or more second controls, generating a definition of the aggregation;

wherein the definition specifies names represented by the selected first visual representations, and wherein the definition specifies a type represented by the one or more selected second visual representations.

22. The data processing system of claim 20 wherein the data processing system is configured to further perform the actions of:

generating a first transform based on the selected first visual representations, wherein the first transform is configured to be inserted into one or more placeholders in one or more pre-configured templates of one or more computation graphs.

23. One or more non-transitory machine-readable hardware storage devices for providing a user with a graphical user interface that displays data items in a data catalog and that provides controls for the user to select data items to be used in generating one or more aggregations, wherein the controls also enable the user to select a type of aggregation, and based on user's selections, automatically generating computer instructions to generate a value of the one or more aggregations that the user had selected, the one or more non-transitory machine-readable hardware storage devices storing instructions that are executable by a data processing system to perform the actions of:

accessing, from a data catalog, names of fields of datasets of a plurality of data sources, with a dataset including multiple data elements, each data element structured with field;

displaying a graphical user interface that provides first visual representations of at least a plurality of the names of the fields of the datasets of the plurality of data sources accessed from the data catalog, with the at least the plurality of the names representing candidate inputs for defining an aggregation;

displaying, in the graphical user interface, one or more first controls for specifying which of the candidate inputs represented by the at least the plurality of the names accessed from the data catalog are selected for defining the aggregation;

wherein a first control specifies which of the candidate inputs are selected by enabling selection of a first visual representation, wherein a selected, first visual representation specifies a name of a field of a dataset of the plurality of data sources selected for defining the aggregation;

identifying first visual representations selected by at least one of the one or more first controls;

identifying, by a data processing system executing logic, names of fields represented by the selected first visual representations;

based on the identified names of fields, determining one or more types of aggregations that are permissible for aggregating data items associated with the identified names of the fields, wherein a type of aggregation is associated with one or more names of one or more fields;

displaying, in the graphical user interface, one or more second visual representations of one or more types of aggregations that are permissible for aggregating the data items;

displaying, in the graphical user interface, one or more second controls for specifying which type of aggregation is selected;

wherein a second control specifies which type of aggregation is selected by enabling selection of a second visual representation;

whereby the graphical user interface provides for selection of one or more resources;

in response to selection of at least one of the resources, displaying, in the graphical user interface, one or more third visual representations of fields associated with the at least one of the resources selected;

based on first visual representations selected by at least one of the one or more first controls, one or more second visual representations selected by at least one of the one or more second controls and at least a selected one of the one or more third visual representations, generating, by the data processing system, computer instructions that are executable to:

detect data items identified by one or more of the names represented by the selected first visual representations; and based on the detected data items and the at least selected one of the one or more third visual representations, generate one or more values of one or more aggregations of one or more types represented by one or more selected second visual representations; and storing, in memory, the computer instructions.

24. The one or more non-transitory machine-readable hardware storage devices of claim 22, wherein the actions further include based on the first visual representations selected by the at least one of the one or more first controls and the one or more second visual representations selected by the at least one of the one or more second controls, generating a definition of the aggregation;

wherein the definition specifies names represented by the selected first visual representations, and wherein the definition specifies a type represented by the one or more selected second visual representations.

25. The one or more non-transitory machine-readable hardware storage devices of claim 22, wherein the actions further include generating a first transform based on the selected first visual representations, wherein the first transform is configured to be inserted into one or more placeholders in one or more pre-configured templates of one or more computation graphs.

* * * * *